United States Patent
Chu

(10) Patent No.: US 10,811,954 B2
(45) Date of Patent: Oct. 20, 2020

(54) SURGE PROTECTIVE APPARATUS OF POWER CONVERSION CIRCUIT

(71) Applicant: DELTA ELECTRONICS, INC., Taoyuan (TW)

(72) Inventor: Chia-Hsien Chu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 5 days.

(21) Appl. No.: 15/964,985

(22) Filed: Apr. 27, 2018

(65) Prior Publication Data
US 2019/0305668 A1 Oct. 3, 2019

(30) Foreign Application Priority Data
Mar. 27, 2018 (CN) .......................... 2018 1 0255946

(51) Int. Cl.
*H02M 1/32* (2007.01)
*H02M 7/06* (2006.01)
*H02M 1/42* (2007.01)

(52) U.S. Cl.
CPC ............. *H02M 1/32* (2013.01); *H02M 7/062* (2013.01); *H02M 1/4233* (2013.01)

(58) Field of Classification Search
CPC .................................. H02M 1/32; H02M 7/217
See application file for complete search history.

(56) References Cited

U.S. PATENT DOCUMENTS

| | | | | |
|---|---|---|---|---|
| 4,835,650 | A * | 5/1989 | Epstein ................... | H02H 9/04 361/111 |
| 6,778,375 | B1 * | 8/2004 | Hoopes .................. | H02H 9/042 361/120 |
| 2003/0086225 | A1 * | 5/2003 | Chaudhry .............. | H02H 5/105 361/91.1 |
| 2006/0238940 | A1 * | 10/2006 | Komulainen ........... | H02M 1/32 361/91.1 |
| 2013/0049709 | A1 * | 2/2013 | Fu ......................... | H02M 1/4225 323/205 |
| 2016/0050724 | A1 * | 2/2016 | Moon .................... | H05B 33/089 315/200 R |

FOREIGN PATENT DOCUMENTS

| | | | |
|---|---|---|---|
| CN | 203026938 | 6/2013 | |
| JP | 2004072846 A * | 3/2004 | ............ H02M 7/219 |
| TW | 201409911 | 3/2014 | |

* cited by examiner

Primary Examiner — Jue Zhang
(74) Attorney, Agent, or Firm — Hauptman Ham, LLP

(57) ABSTRACT

A surge protective apparatus of a power conversion circuit includes an AC-to-DC conversion circuit and two voltage clamping units. The AC-to-DC conversion circuit receives an AC power source and converts the AC power source into a DC power source. The DC power source is provided between a positive output terminal and a negative output terminal of the AC-to-DC conversion circuit. Two first ends of the two voltage clamping units are respectively coupled to a first AC terminal and a second AC terminal of the AC power source, and two second ends of the two voltage clamping units are commonly coupled to the positive output terminal or the negative output terminal. Accordingly, it is to effectively suppress surge energy generated from the AC power source.

16 Claims, 25 Drawing Sheets

SURGE PROTECTIVE APPARATUS OF POWER CONVERSION CIRCUIT

BACKGROUND

Technical Field

The present disclosure relates to a protective apparatus of a power conversion circuit, and more particularly to a surge protective apparatus of a power conversion circuit.

Description of Related Art

The statements in this section merely provide background information related to the present disclosure and do not necessarily constitute prior art.

The surge protection circuit is implemented by connecting surge-proof components, varistors, or other protection components with safety approval and regulation at the AC input terminal to suppress the surge energy, thereby avoiding damaging circuit components mounted on the main circuit path. Since the protection components are limited due to the safety approval and regulation, such as a limitation of 1.25 times rated voltage, the less surge energy could be clamped (namely only a part of surge energy can be clamped) once the operating voltage of the protection component is higher. At this condition, the remaining surge energy, which is not clamped, passes into the main circuit path to cause damage to the circuit components mounted on the main circuit path. In addition, bypass diodes may be used at the AC input terminal to bypass the surge energy to the output capacitor through the bypass diodes, however, the output capacitor would be damaged due to the excessive voltage applied to the output capacitor. Therefore, the protection component with higher energy-clamping capability could be used to solve the foregoing problems, however, it would increase component costs and occupied space.

SUMMARY

An objective of the present disclosure is to provide a surge protective apparatus of a power conversion circuit to solve problems of the limitation of safety approval and regulation and the failure of effective surge energy suppression.

In order to achieve the above-mentioned objective, the surge protective apparatus of a power conversion circuit includes an AC-to-DC conversion circuit and at least two voltage clamping units. The AC-to-DC conversion circuit receives an AC power source and converts the AC power source into a DC power source, wherein the DC power source is connected across a positive output terminal and a negative output terminal of the AC-to-DC conversion circuit. A first end of each voltage clamping unit is coupled to a first AC terminal and a second AC terminal of the AC power source, and a second end of each voltage clamping unit is commonly coupled to the positive output terminal or the negative output terminal.

Accordingly, the surge protective apparatus of the power conversion circuit is provided to effectively suppress surge energy, reduce component costs, and reduce occupied space to meet the requirements of miniaturization.

Another objective of the present disclosure is to provide a surge protective apparatus of a power conversion circuit to solve problems of the limitation of safety approval and regulation and the failure of effective surge energy suppression.

In order to achieve the above-mentioned objective, the surge protective apparatus of a power conversion circuit includes an AC-to-DC conversion circuit and two voltage clamping units. The AC-to-DC conversion circuit receives an AC power source and converts the AC power source into a DC power source, wherein the DC power source is connected across a positive output terminal and a negative output terminal of the AC-to-DC conversion circuit. A first end of each voltage clamping unit is coupled to a line end or a neutral end of the AC power source, and a second end of each voltage clamping unit is coupled to the positive output terminal or the negative output terminal.

Accordingly, the surge protective apparatus of the power conversion circuit is provided to effectively suppress surge energy, reduce component costs, and reduce occupied space to meet the requirements of miniaturization.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

The present disclosure can be more fully understood by reading the following detailed description of the embodiment, with reference made to the accompanying drawings as follows.

DETAILED DESCRIPTION

Figure 1:
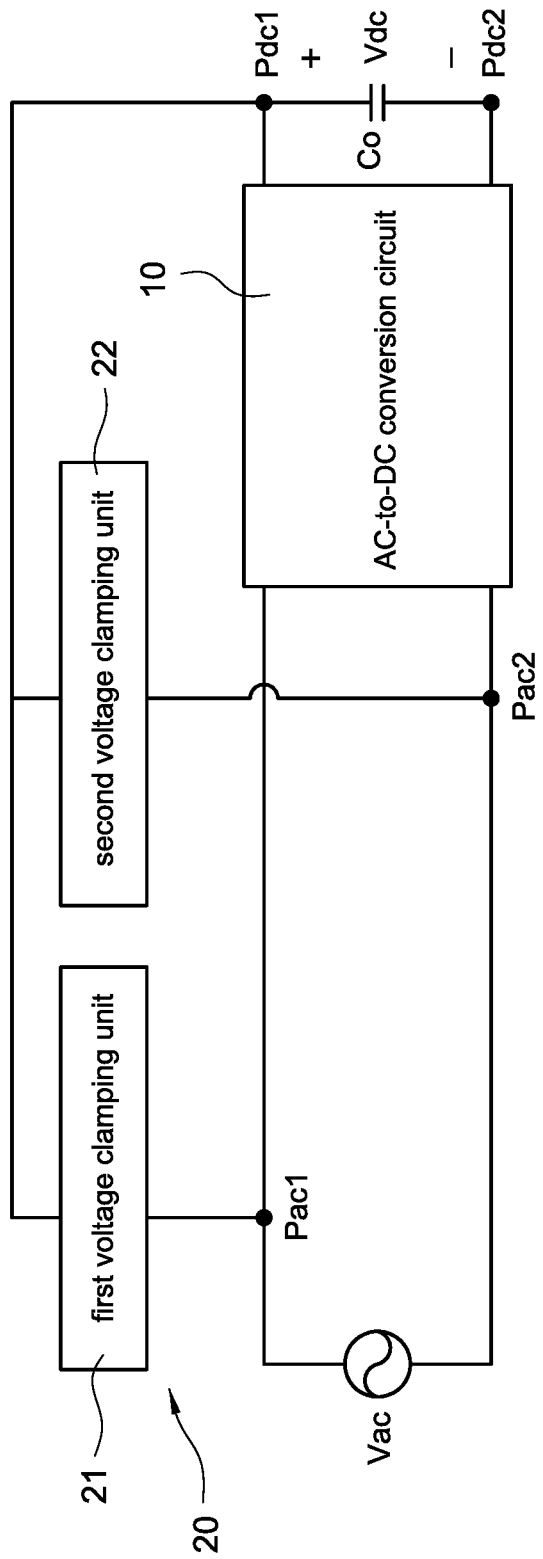
FIG. 1 is a block circuit diagram of a surge protective apparatus of a power conversion circuit according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a surge protective apparatus of a power conversion circuit according to a first embodiment of the present disclosure. The surge protective apparatus of the power conversion circuit includes an AC-to-DC conversion circuit 10 and two voltage clamping units 20 having a first voltage clamping unit 21 and a second voltage clamping unit 22. The AC-to-DC conversion circuit 10 receives an AC power source Vac and converts the AC power source Vac into a DC power source Vdc. In one embodiment, the AC-to-DC conversion circuit 10 may be a power factor correction (PFC) circuit with different topologies, and the detailed descriptions will be made hereinafter.

The DC power source Vdc converted by the AC-to-DC conversion circuit 10 is connected across a positive output terminal Pdc1 and a negative output terminal Pdc2 of the AC-to-DC conversion circuit 10. More specifically, the surge protective apparatus of the power conversion circuit further includes an output capacitor Co, and the output capacitor Co is coupled between the positive output terminal Pdc1 and the negative output terminal Pdc2 for providing the DC power source Vdc.

Each voltage clamping unit 20 has a first end and a second end. The first ends of the voltage clamping units 20 are respectively connected to a first AC terminal Pac1 and a second AC terminal Pac2, and the second ends of the voltage clamping units 20 are commonly connected to the positive output terminal Pdc1 or the negative output terminal Pdc2. In one embodiment, the first AC terminal Pac1 may be a line end and the second AC terminal Pac2 may be a neutral end. As shown in FIG. 1, the first end of the first voltage clamping unit 21 is coupled to the first AC terminal Pac1 (namely the line end) of the AC power source Vac, and the first end of the second voltage clamping unit 22 is coupled to the second AC terminal Pac2 (namely the neutral end) of the AC power source Vac. Also, the second end of the first voltage clamping unit 21 and the second end of the second voltage clamping unit 22 are commonly connected to the positive output terminal Pdc1.

Figure 2:
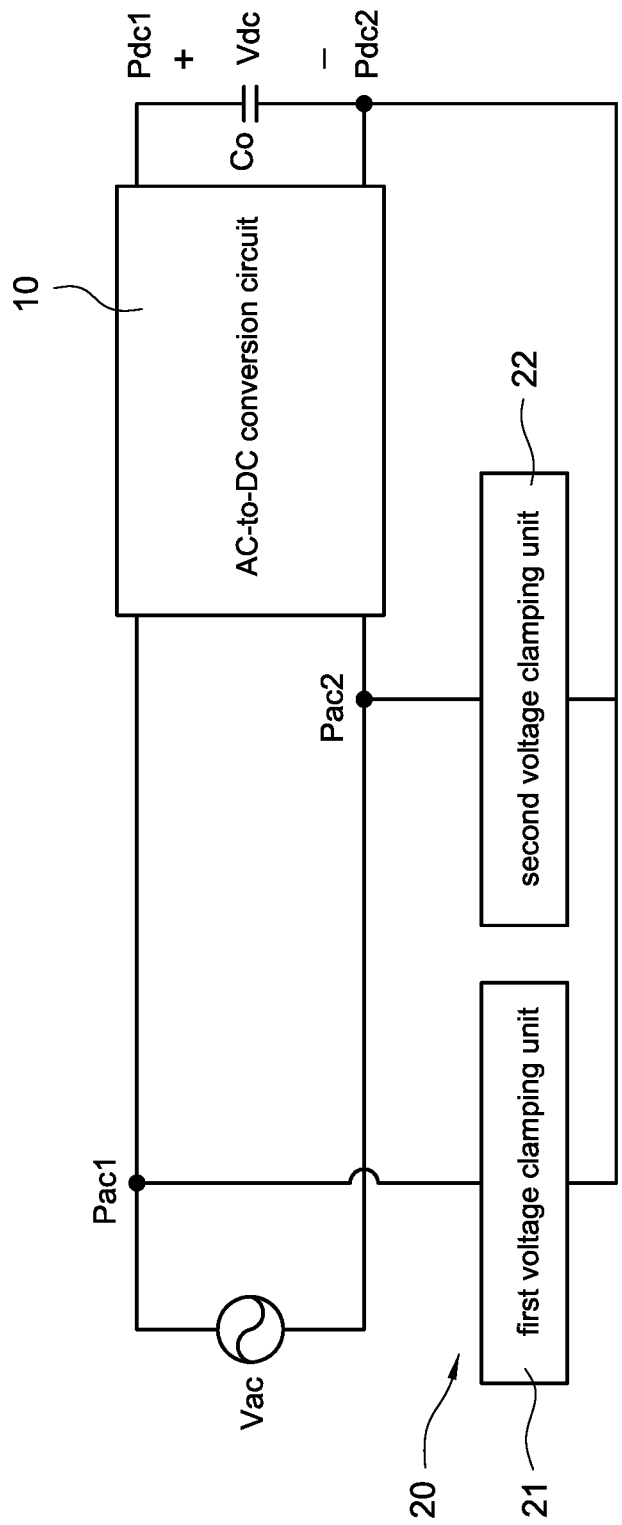
FIG. 2 is a block circuit diagram of the surge protective apparatus of the power conversion circuit according to a second embodiment of the present disclosure.

Please refer to FIG. 2, which shows a block circuit diagram of the surge protective apparatus of the power conversion circuit according to a second embodiment of the present disclosure. The major difference between the second embodiment shown in FIG. 2 and the first embodiment shown in FIG. 1 is that the second end of the first voltage clamping unit 21 and the second end of the second voltage clamping unit 22 are commonly connected to the negative output terminal Pdc2 of the former.

Figure 3:
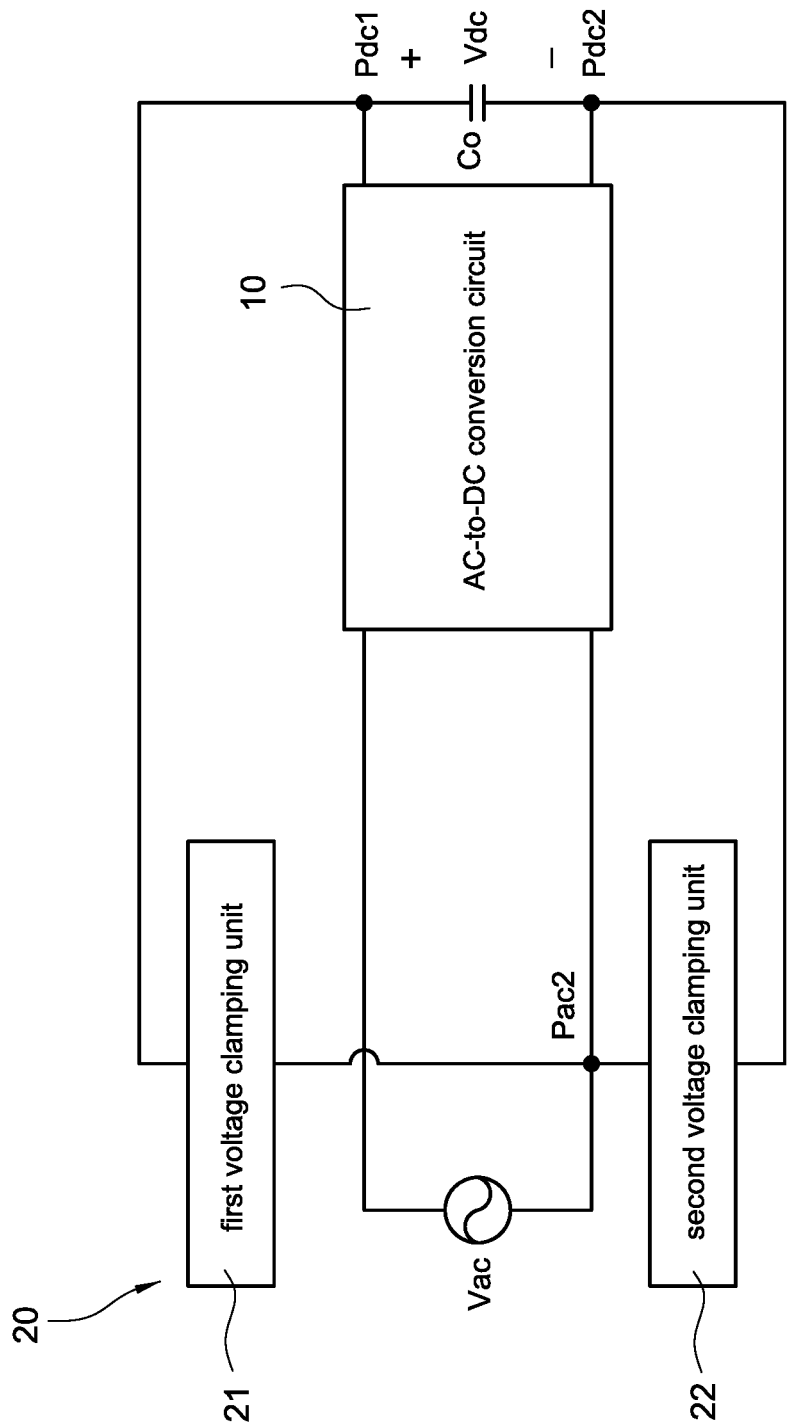
FIG. 3 is a block circuit diagram of the surge protective apparatus of the power conversion circuit according to a third embodiment of the present disclosure.

Please refer to FIG. 3, which shows a block circuit diagram of the surge protective apparatus of the power conversion circuit according to a third embodiment of the present disclosure. The major difference between the third embodiment shown in FIG. 3 and the first embodiment shown in FIG. 1 is that the first end of the first voltage clamping unit 21 and the first end of the second voltage clamping unit 22 are commonly coupled to the second AC terminal Pac2 (namely the neutral end) of the AC power source Vac, and the second end of the first voltage clamping unit 21 is connected to the positive output terminal Pdc1 and the second end of the second voltage clamping unit 22 is connected to the negative output terminal Pdc2 of the former.

Figure 4:
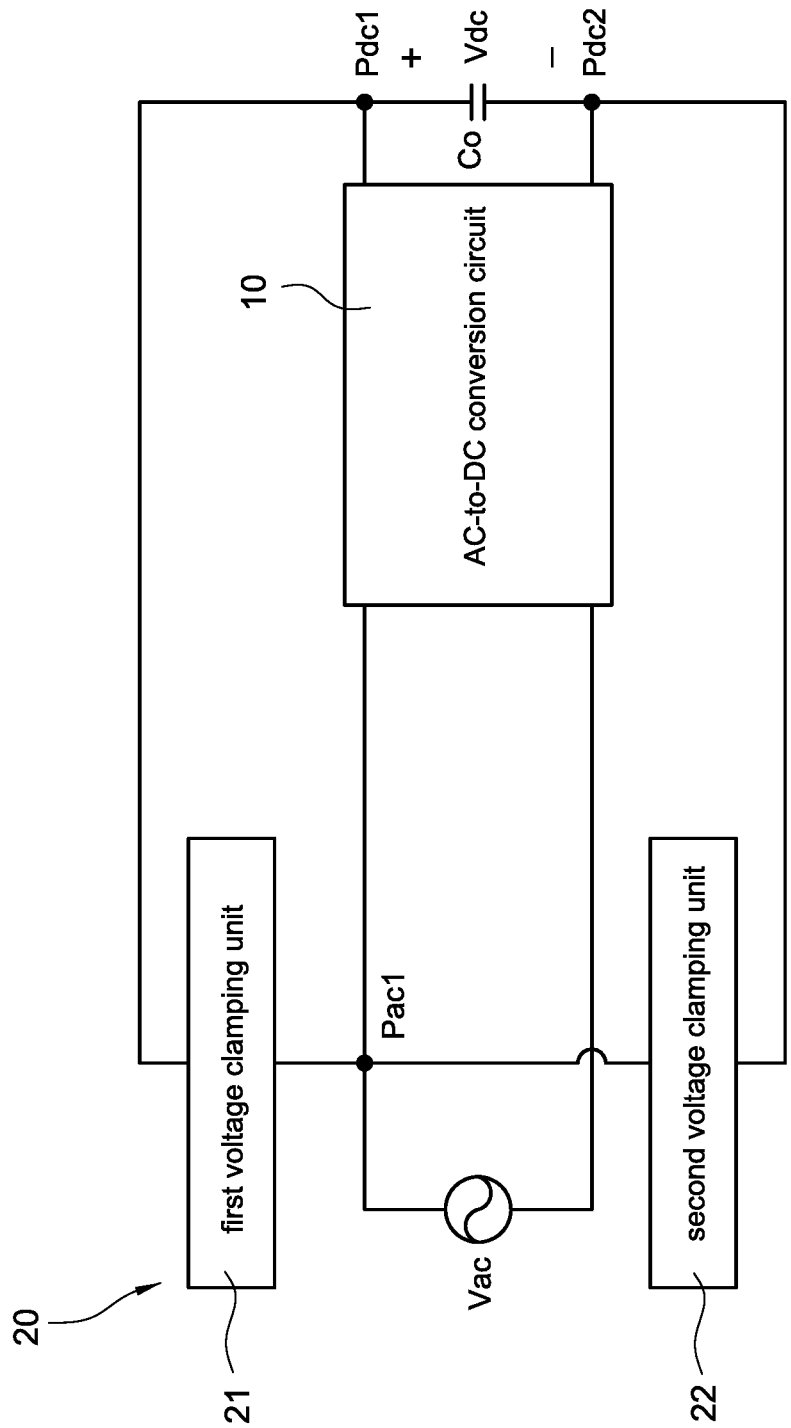
FIG. 4 is a block circuit diagram of the surge protective apparatus of the power conversion circuit according to a fourth embodiment of the present disclosure.

Please refer to FIG. 4, which shows a block circuit diagram of the surge protective apparatus of the power conversion circuit according to a fourth embodiment of the present disclosure. The major difference between the fourth embodiment shown in FIG. 4 and the third embodiment shown in FIG. 3 is that the first end of the first voltage clamping unit 21 and the first end of the second voltage clamping unit 22 are commonly coupled to the first AC terminal Pac1 (namely the line end) of the AC power source Vac, and the second end of the first voltage clamping unit 21 is connected to the positive output terminal Pdc1 and the second end of the second voltage clamping unit 22 is connected to the negative output terminal Pdc2 of the former.

Figure 5C:
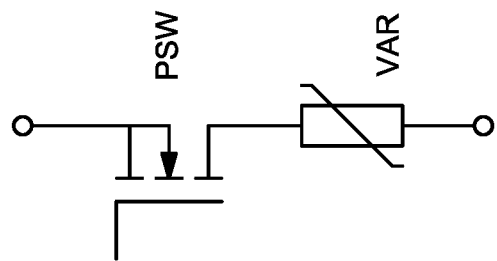
FIG. 5C is a circuit diagram of the voltage clamping unit according to a third embodiment of the present disclosure.
Figure 5B:
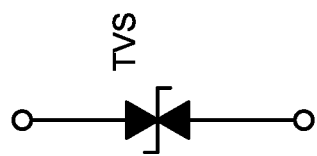
FIG. 5B is a circuit diagram of the voltage clamping unit according to a second embodiment of the present disclosure.
Figure 5A:
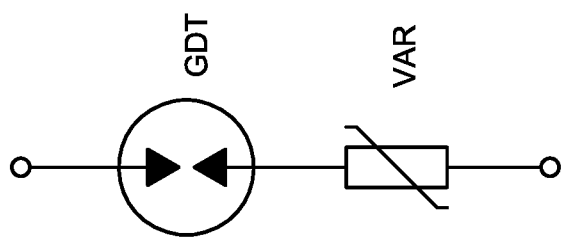
FIG. 5A is a circuit diagram of a voltage clamping unit according to a first embodiment of the present disclosure.

Please refer to FIG. 5A to FIG. 5C, which show circuit diagrams of the voltage clamping unit according to a first embodiment, a second embodiment, and a third embodiment of the present disclosure, respectively. As shown in FIG. 5A, each voltage clamping unit 20 includes a varistor VAR and a gas discharge tube GDT. The gas discharge tube GDT is connected in series to the varistor VAR to form a series-connected structure, and one end of the series-connected structure is coupled to the AC power source Vac and the other end of the series-connected structure is coupled to the DC power source Vdc. Accordingly, the voltage clamping unit 20 composed of the gas discharge tube GDT and the varistor VAR connected in series to the gas discharge tube GDT is provided to protect the AC-to-DC conversion circuit 10 from damage by absorbing and suppressing the surge energy generated from the abnormal high surge voltage.

As shown in FIG. 5B, each voltage clamping unit 20 includes a transient voltage suppressor TVS, and one end of the transient voltage suppressor TVS is coupled to the AC power source Vac and the other end of the transient voltage suppressor TVS is coupled to the DC power source Vdc. Accordingly, the voltage clamping unit 20 composed of the transient voltage suppressor TVS is provided to protect the AC-to-DC conversion circuit 10 from damage by absorbing and suppressing the surge energy generated from the abnormal high surge voltage.

As shown in FIG. 5C, each voltage clamping unit 20 includes a varistor VAR and a power switch PSW. The power switch PSW is connected in series to the varistor VAR to form a series-connected structure, and one end of the series-connected structure is coupled to the AC power source Vac and the other end of the series-connected structure is coupled to the DC power source Vdc. Accordingly, the voltage clamping unit 20 composed of the power switch PSW and the varistor VAR connected in series to the power switch PSW is provided to protect the AC-to-DC conversion circuit 10 from damage by absorbing and suppressing the surge energy generated from the abnormal high surge voltage. In particular, the power switch PSW is usually controlled by a control unit. More specifically, the control unit produces a control signal to turn on or turn off the power switch PSW so as to achieve an equivalent control of making the gas discharge tube GDT shown in FIG. 5A be in the open condition or the turned-on condition. When the AC power source Vac or the voltage across the output capacitor Co increases up to a predetermined operating voltage, the control unit turns on the power switch PSW to make the varistor VAR start to absorb the surge energy released from the DC power source Vdc to the AC power source Vac, thereby providing the surge protection for the AC-to-DC conversion circuit 10.

Figure 6A:
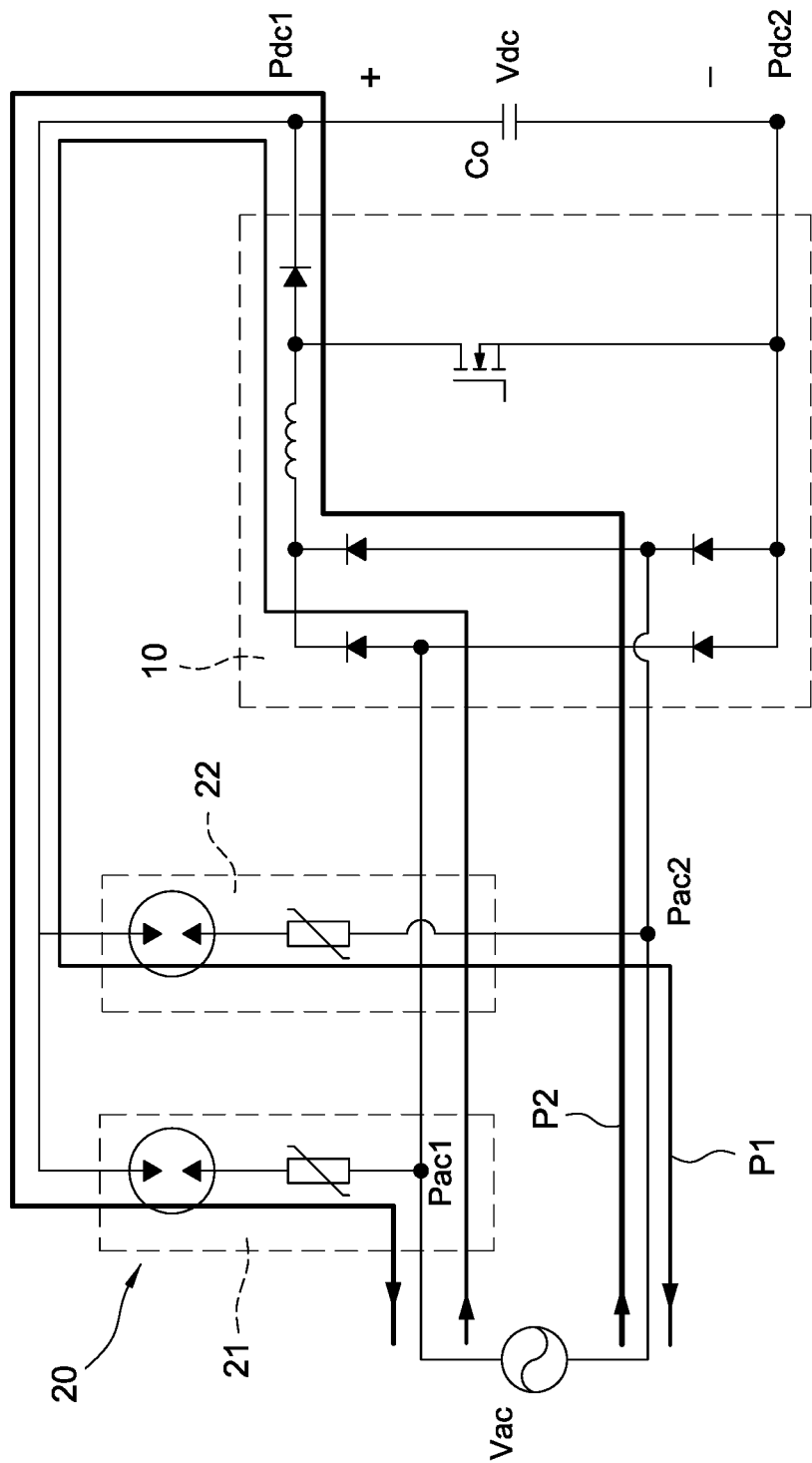
FIG. 6A is a detailed circuit diagram of an AC-to-DC conversion circuit according to a first embodiment in FIG. 1.
Figure 6B:
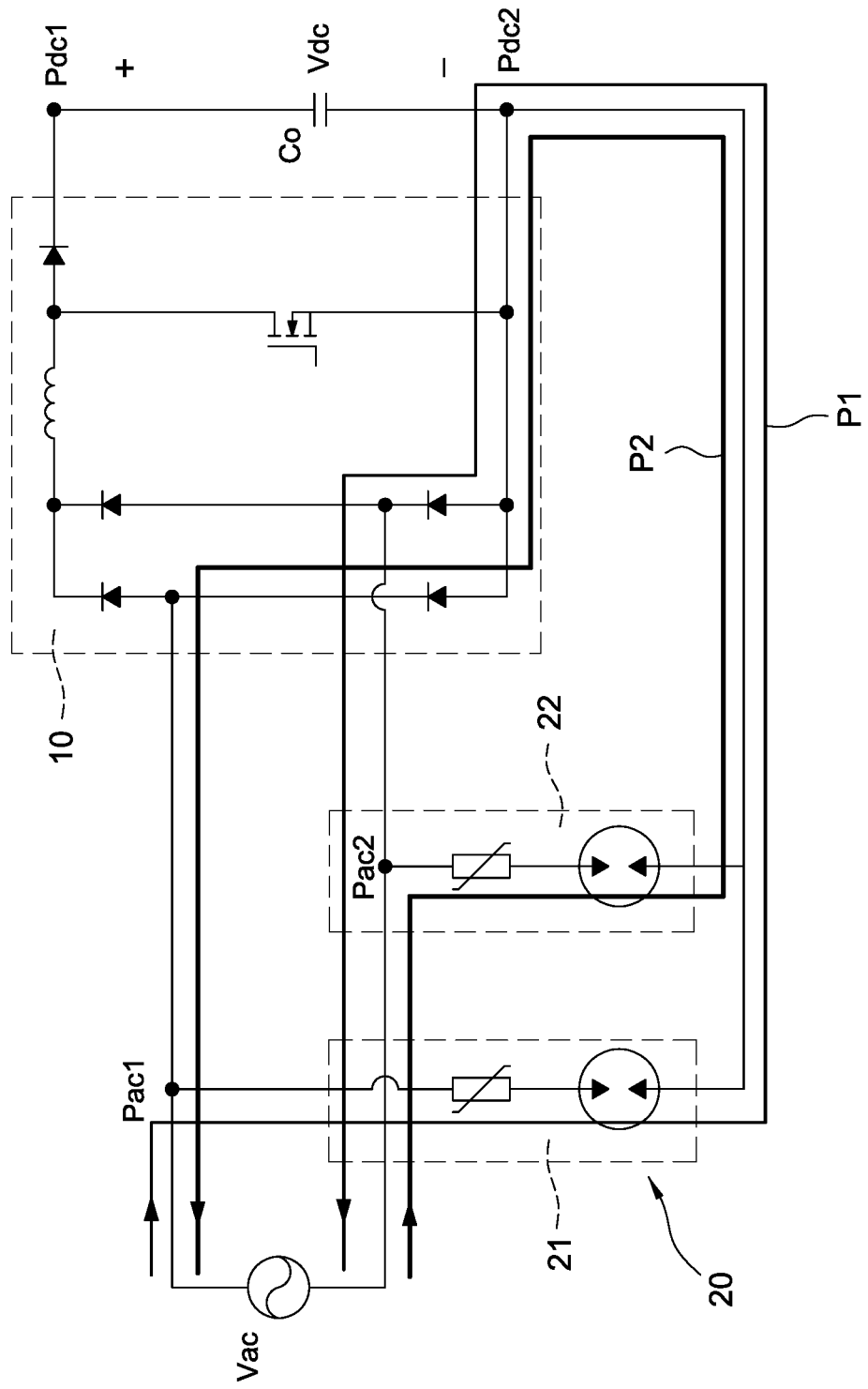
FIG. 6B is a detailed circuit diagram of the AC-to-DC conversion circuit according to the first embodiment in FIG. 2.
Figure 6C:
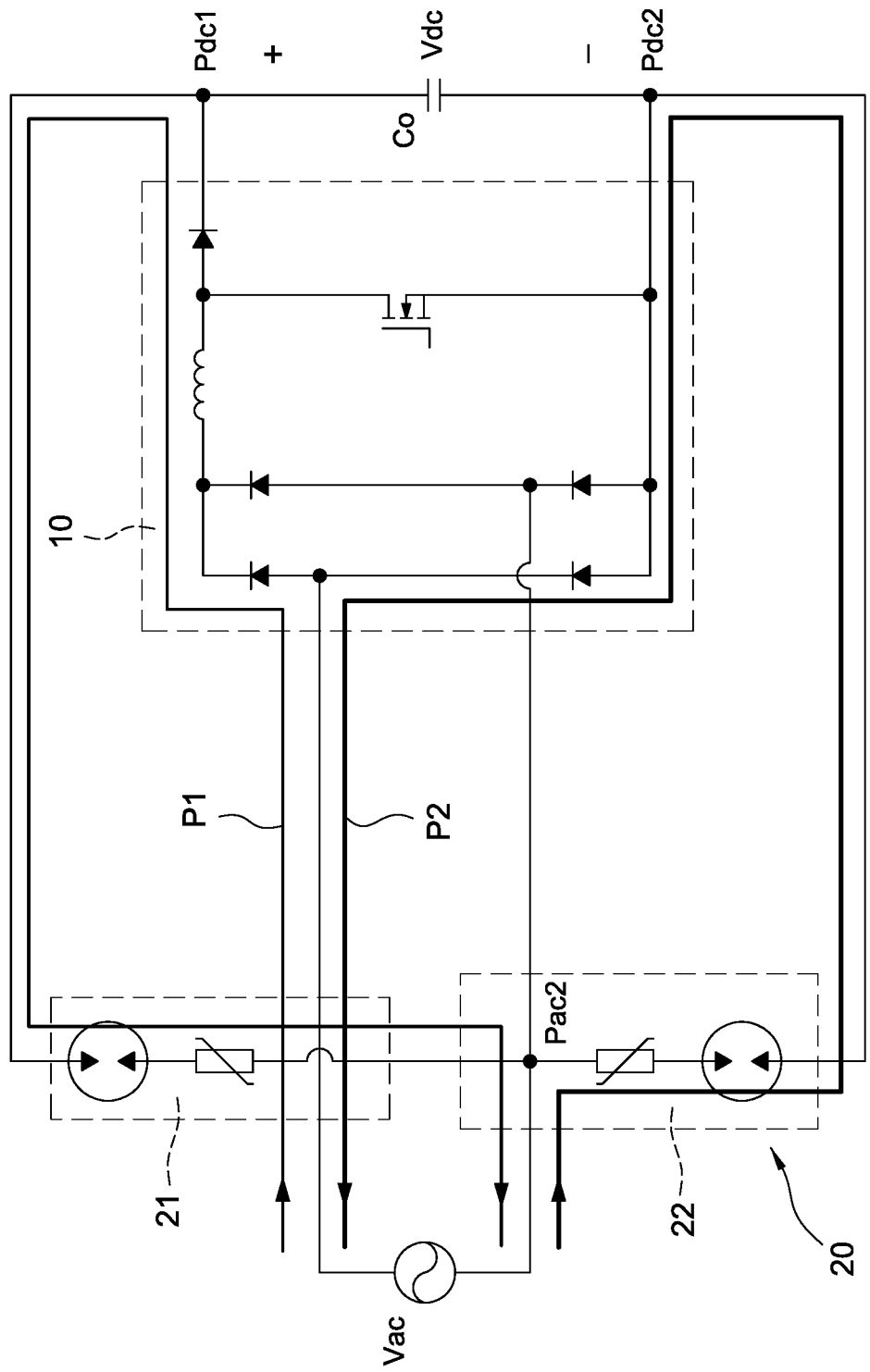
FIG. 6C is a detailed circuit diagram of the AC-to-DC conversion circuit according to the first embodiment in FIG. 3.
Figure 6D:
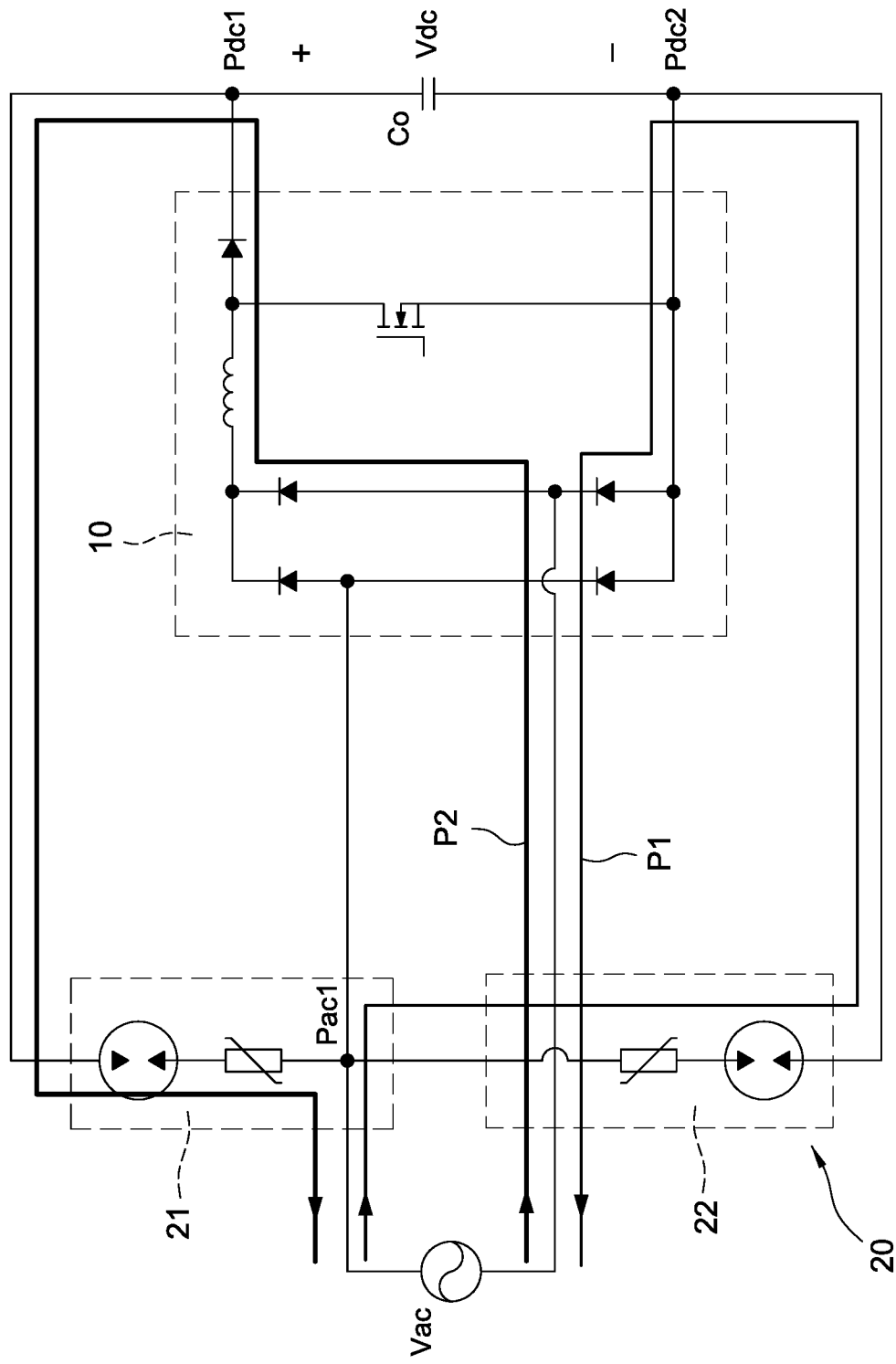
FIG. 6D is a detailed circuit diagram of the AC-to-DC conversion circuit according to the first embodiment in FIG. 4.

Please refer to FIG. 6A, which shows a detailed circuit diagram of an AC-to-DC conversion circuit according to a first embodiment in FIG. 1. The AC-to-DC conversion circuit 10 of the first embodiment is composed of a rectifying circuit and a boost circuit, which is commonly used for the PFC application. In subsequent different embodiments, the voltage clamping unit 20 composed of the gas discharge tube GDT and the varistor VAR shown in FIG. 5A is exemplified for further demonstration. Similarly, FIG. 6B to FIG. 6D are the detailed circuit diagrams of the first embodiment of the AC-to-DC conversion circuit corresponding to the block circuit diagrams in FIG. 2 to FIG. 4.

Figure 7A:
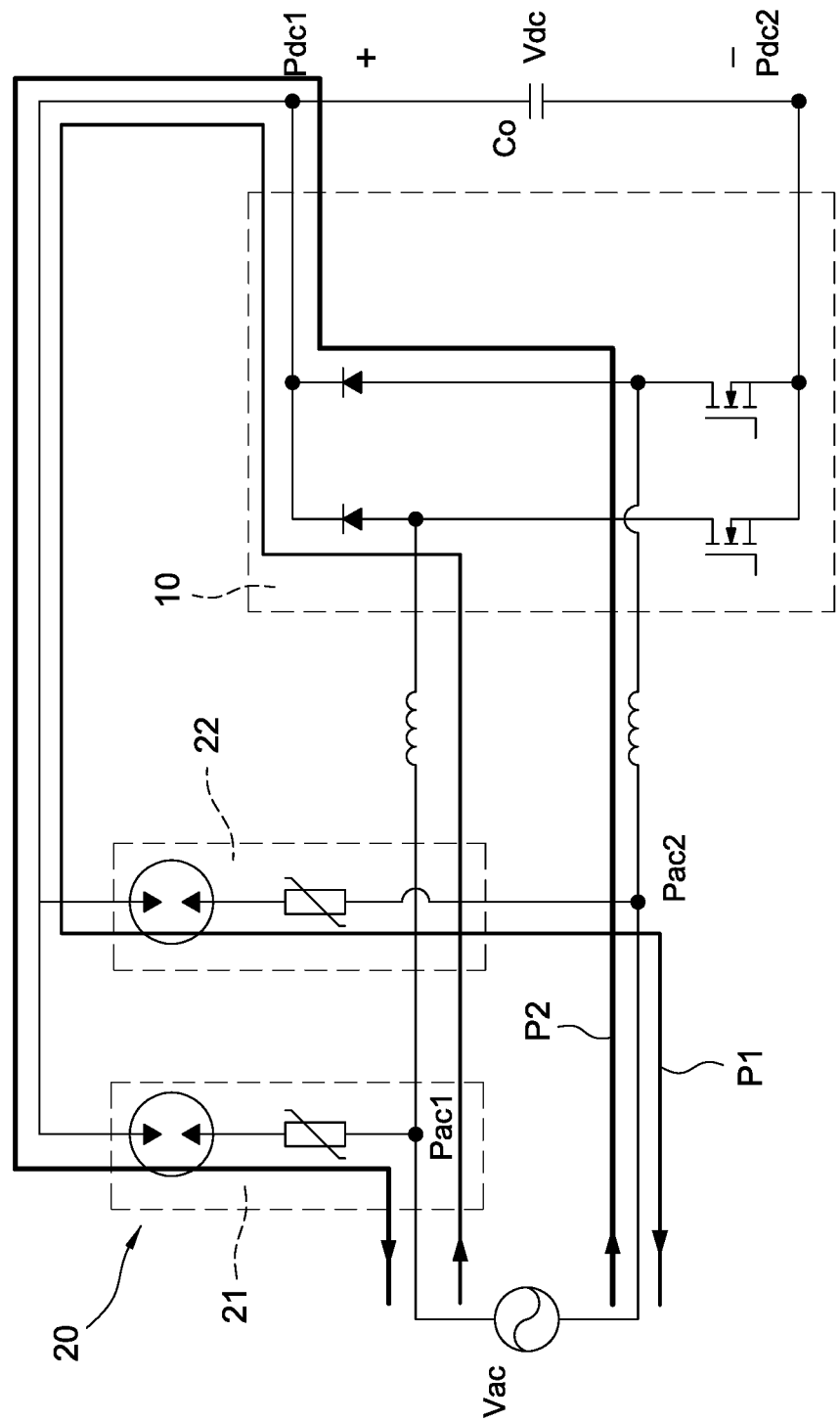
FIG. 7A is a detailed circuit diagram of the AC-to-DC conversion circuit according to a second embodiment in FIG. 1.
Figure 7B:
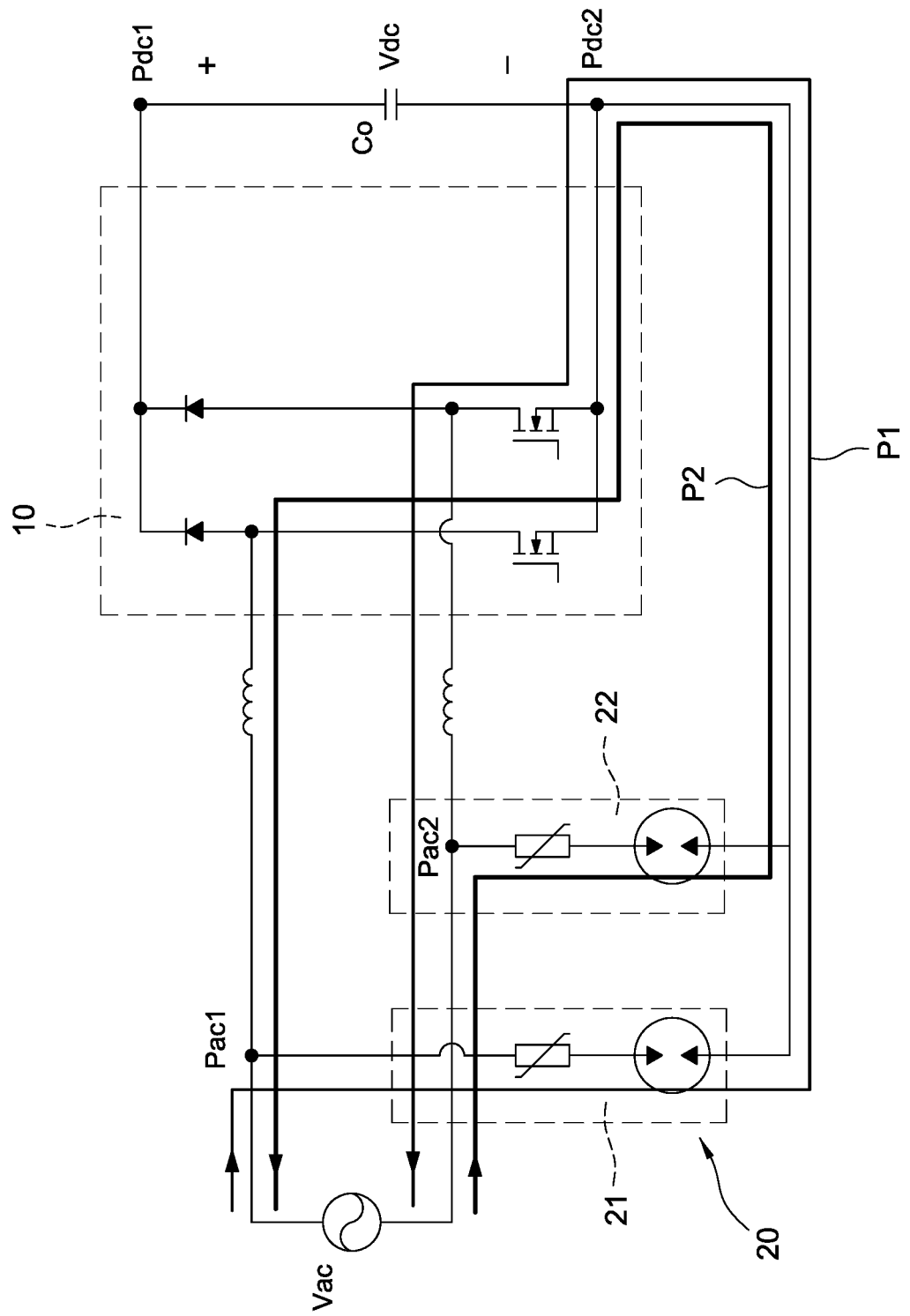
FIG. 7B is a detailed circuit diagram of the AC-to-DC conversion circuit according to the second embodiment in FIG. 2.
Figure 7C:
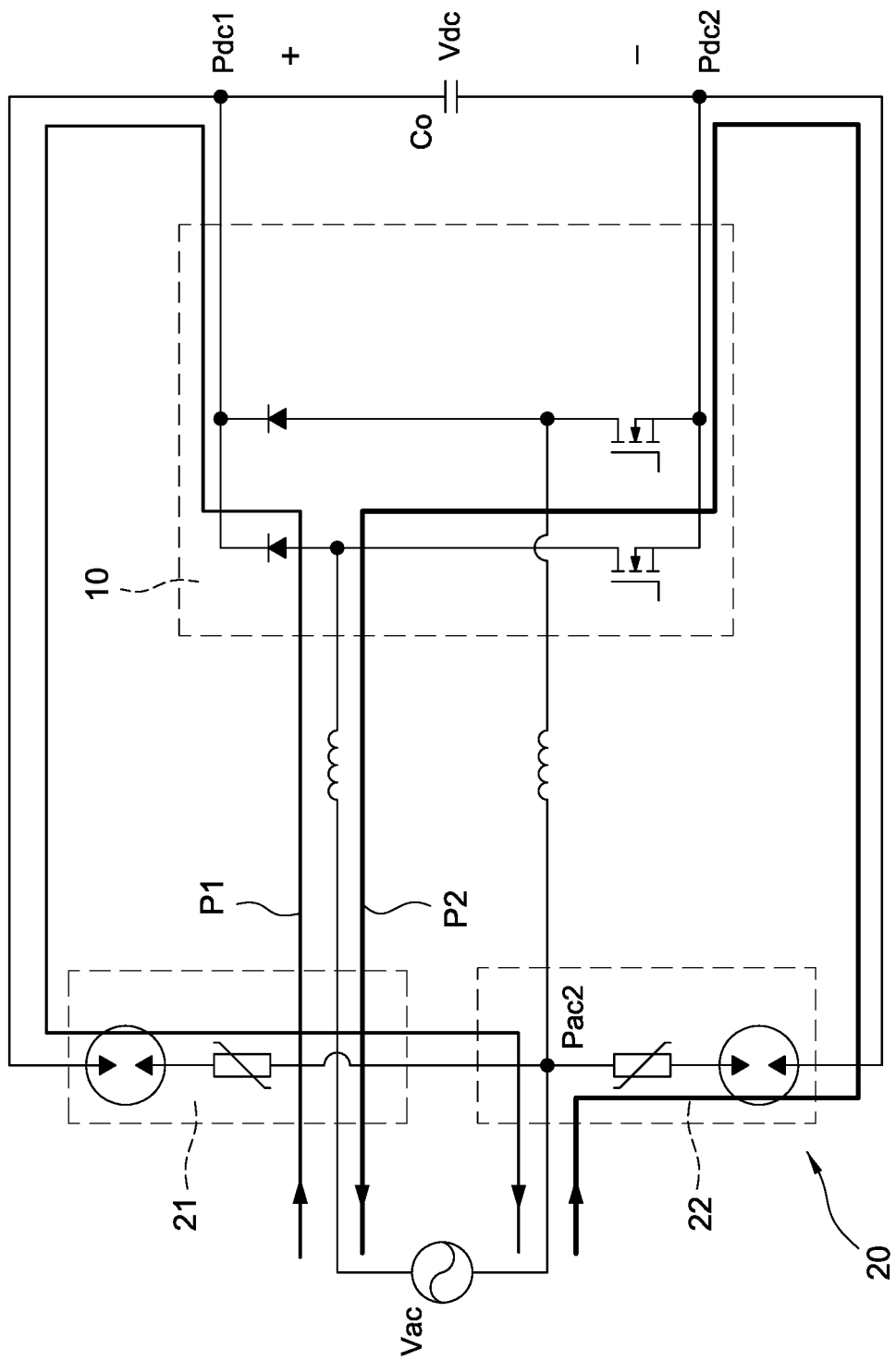
FIG. 7C is a detailed circuit diagram of the AC-to-DC conversion circuit according to the second embodiment in FIG. 3.
Figure 7D:
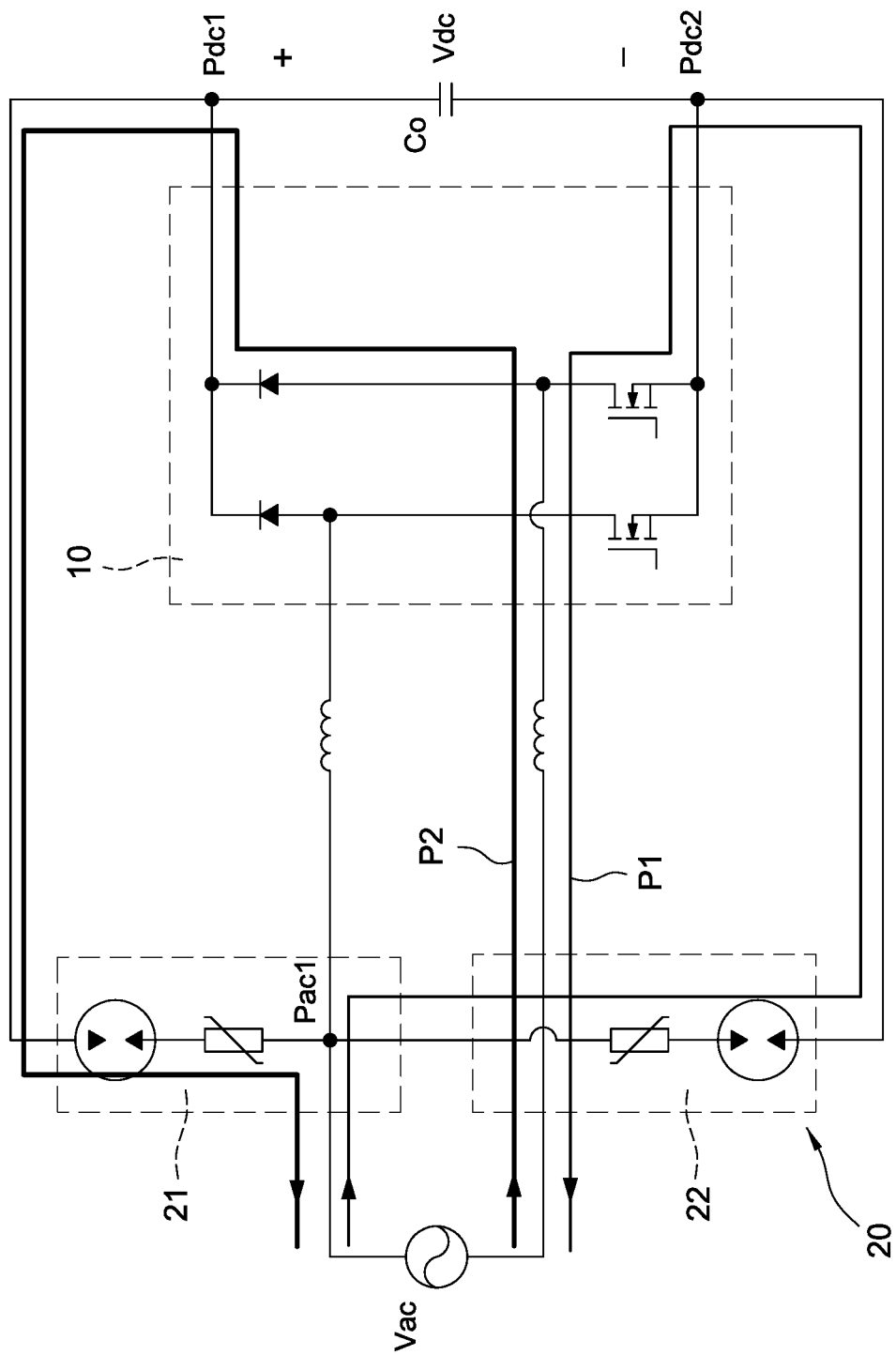
FIG. 7D is a detailed circuit diagram of the AC-to-DC conversion circuit according to the second embodiment in FIG. 4.

Please refer to FIG. 7A, which shows a detailed circuit diagram of the AC-to-DC conversion circuit according to a second embodiment in FIG. 1. The AC-to-DC conversion circuit 10 of the second embodiment is a bridgeless PFC. In subsequent different embodiments, the voltage clamping unit 20 composed of the gas discharge tube GDT and the varistor VAR shown in FIG. 5A is exemplified for further demonstration. Similarly, FIG. 7B to FIG. 7D are the detailed circuit diagrams of the second embodiment of the AC-to-DC conversion circuit corresponding to the block circuit diagrams in FIG. 2 to FIG. 4.

Figure 8A:
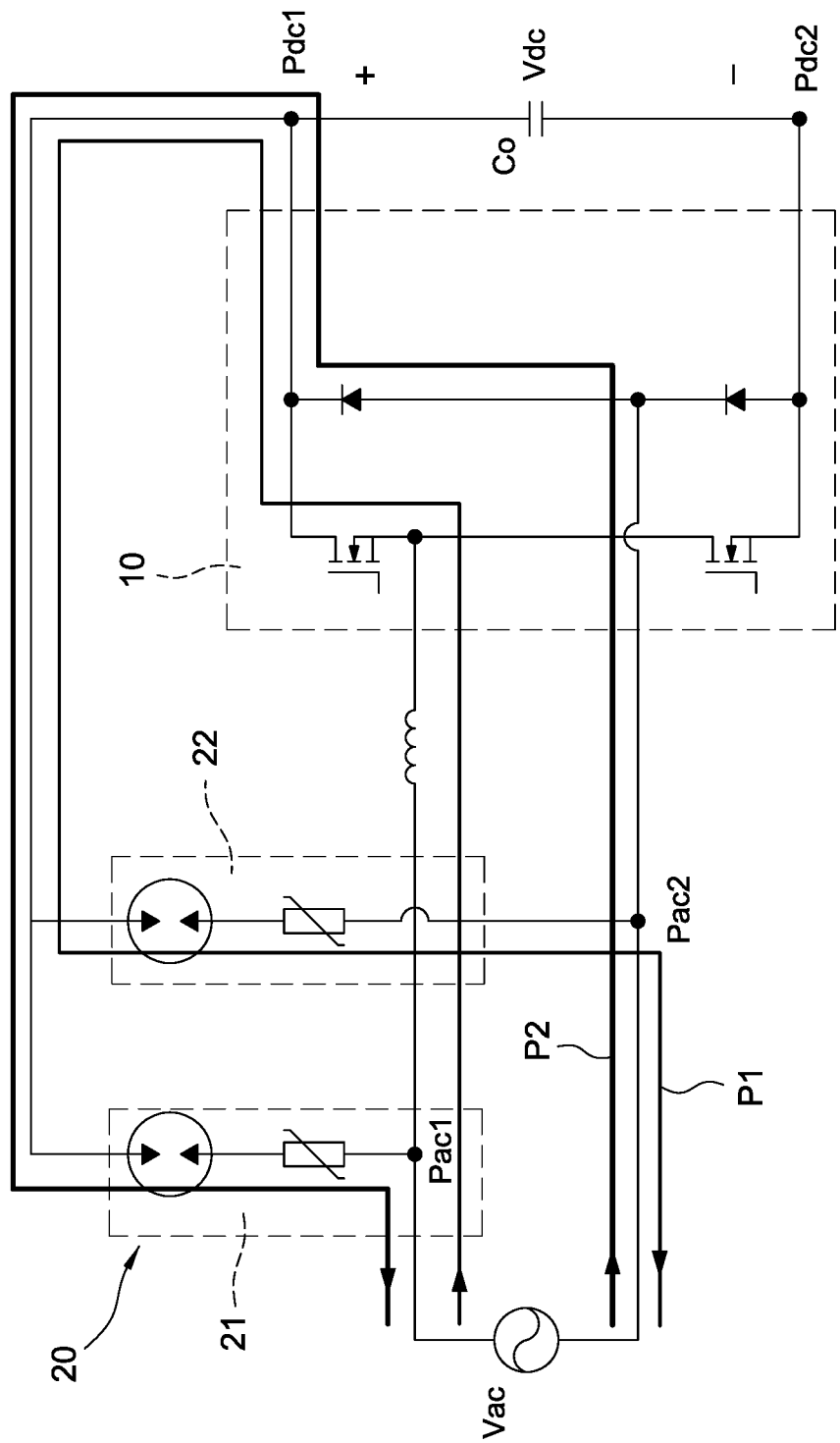
FIG. 8A is a detailed circuit diagram of the AC-to-DC conversion circuit according to a third embodiment in FIG. 1.
Figure 8B:
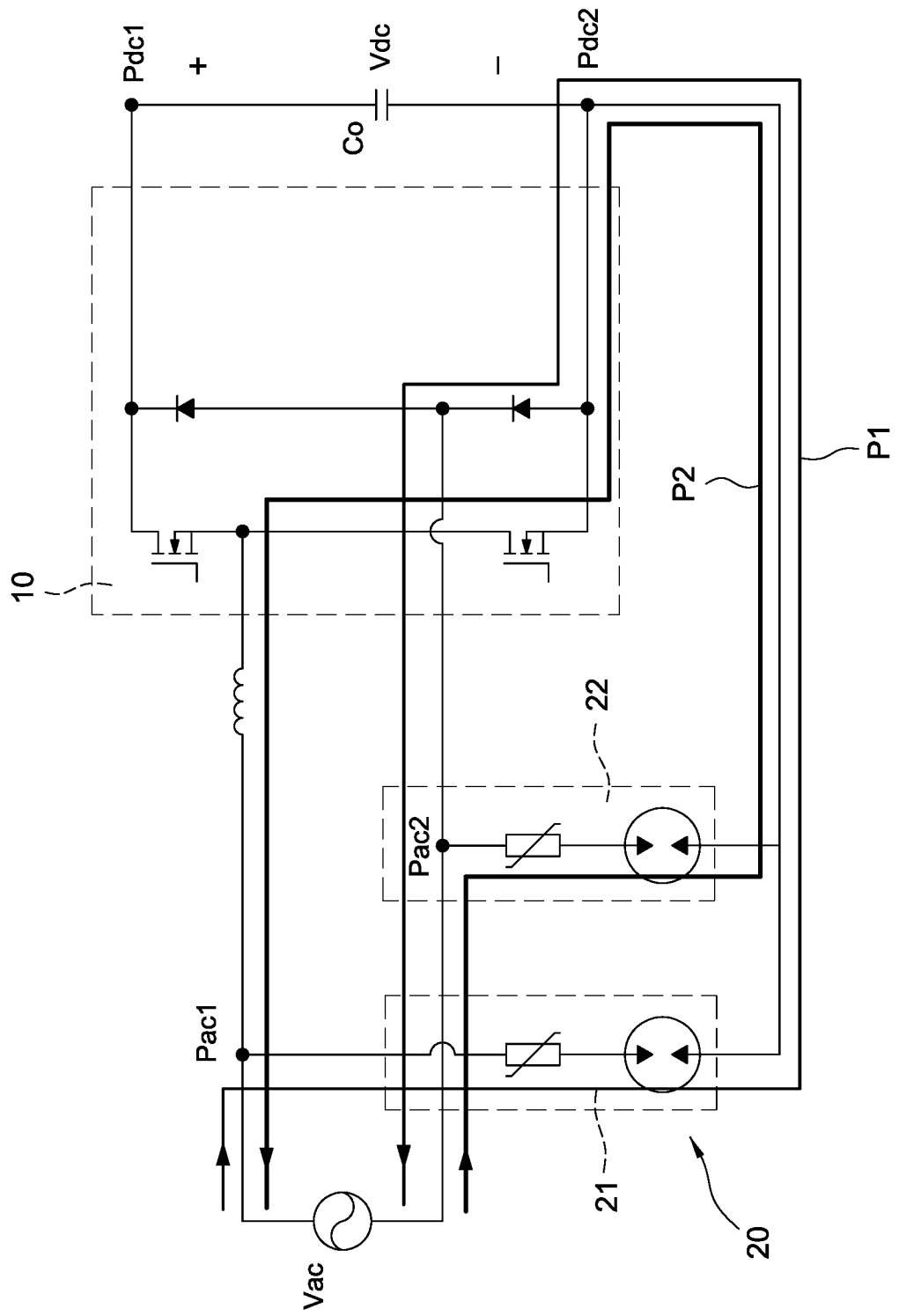
FIG. 8B is a detailed circuit diagram of the AC-to-DC conversion circuit according to the third embodiment in FIG. 2.
Figure 8C:
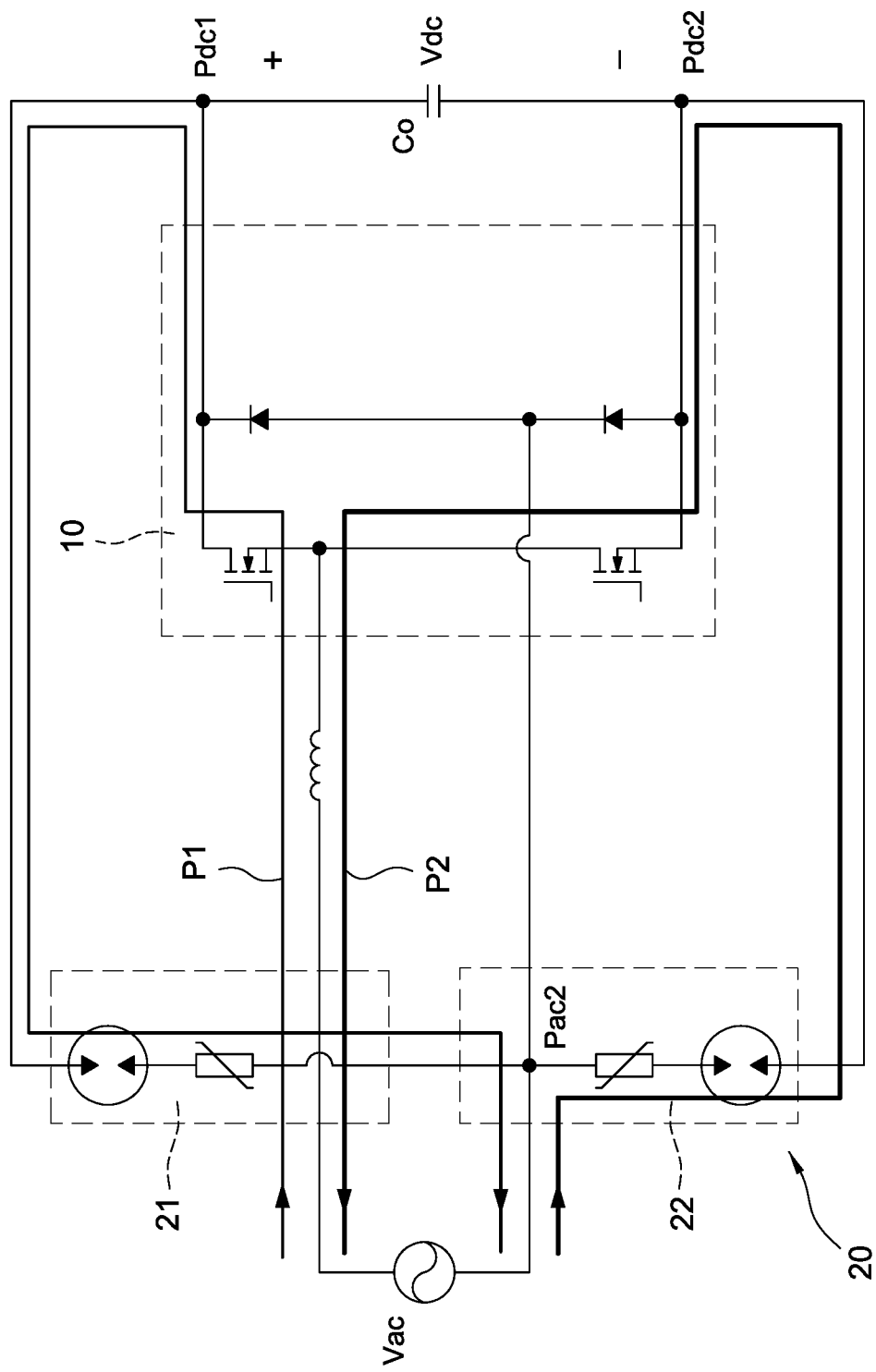
FIG. 8C is a detailed circuit diagram of the AC-to-DC conversion circuit according to the third embodiment in FIG. 3.
Figure 8D:
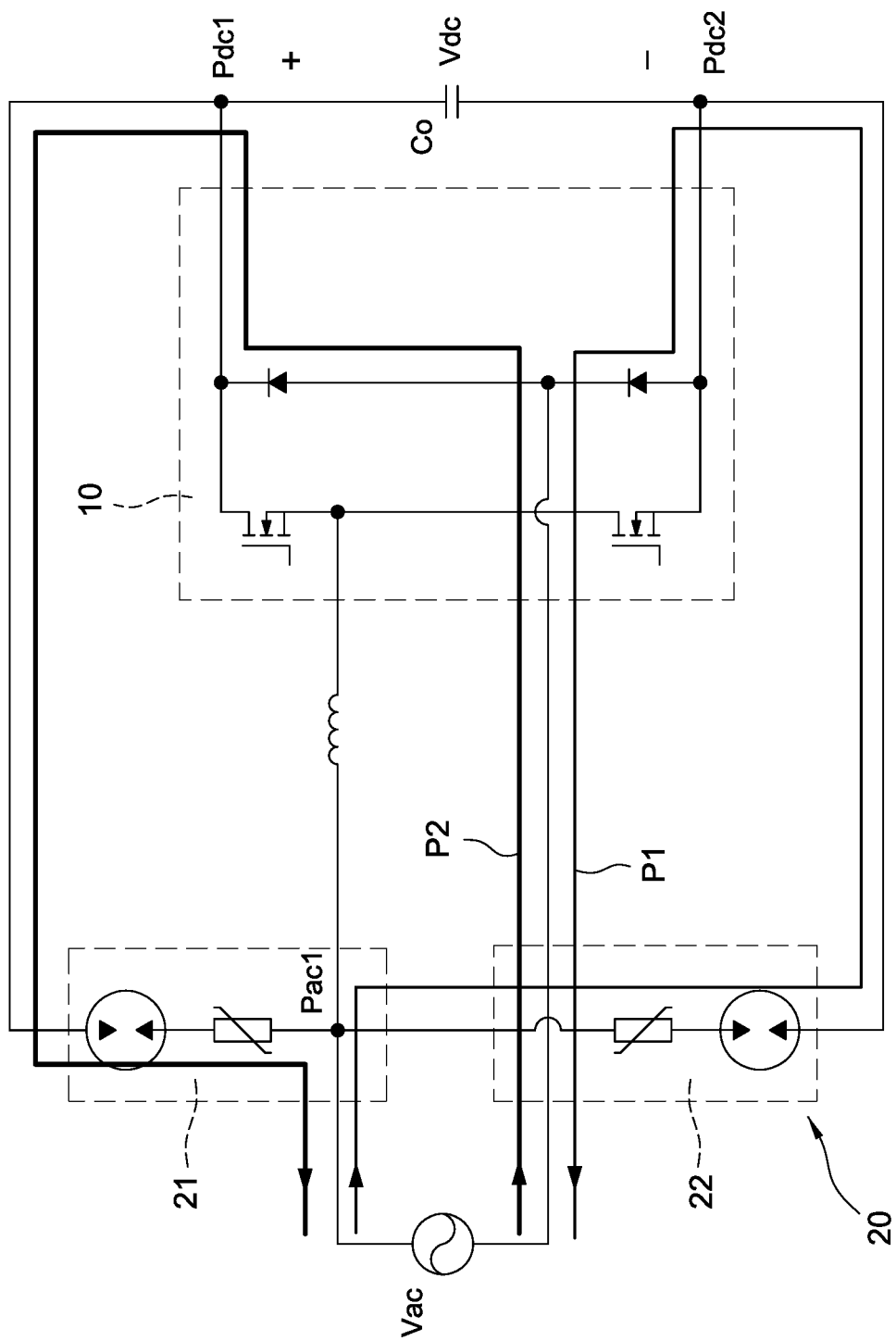
FIG. 8D is a detailed circuit diagram of the AC-to-DC conversion circuit according to the third embodiment in FIG. 4.

Please refer to FIG. 8A, which shows a detailed circuit diagram of the AC-to-DC conversion circuit according to a third embodiment in FIG. 1. The AC-to-DC conversion circuit 10 of the third embodiment is a Totem pole PFC. In subsequent different embodiments, the voltage clamping unit 20 composed of the gas discharge tube GDT and the varistor VAR shown in FIG. 5A is exemplified for further demonstration. Similarly, FIG. 8B to FIG. 8D are the detailed circuit diagrams of the third embodiment of the AC-to-DC conversion circuit corresponding to the block circuit diagrams in FIG. 2 to FIG. 4.

Figure 9A:
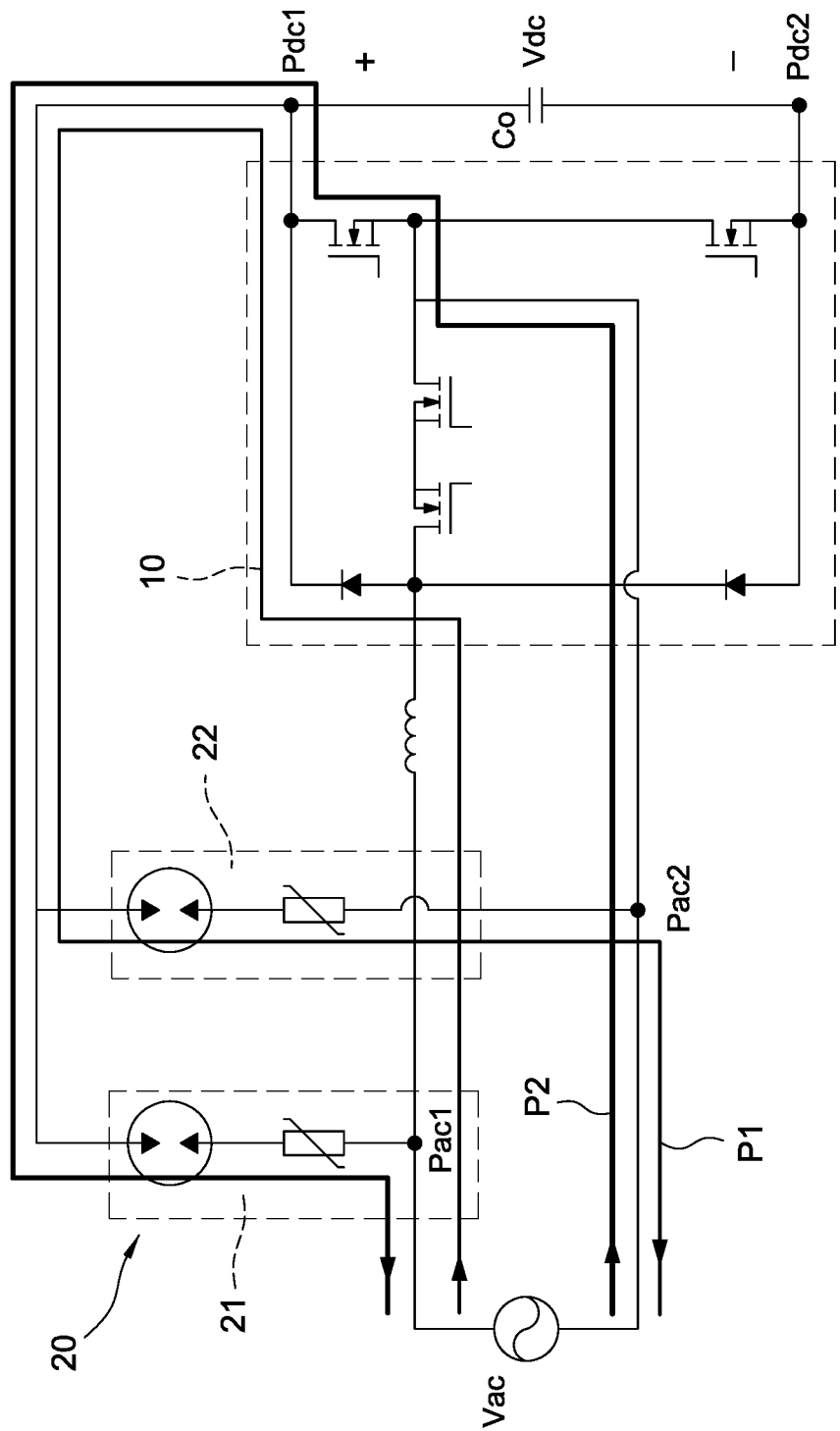
FIG. 9A is a detailed circuit diagram of the AC-to-DC conversion circuit according to a fourth embodiment in FIG. 1.
Figure 9B:
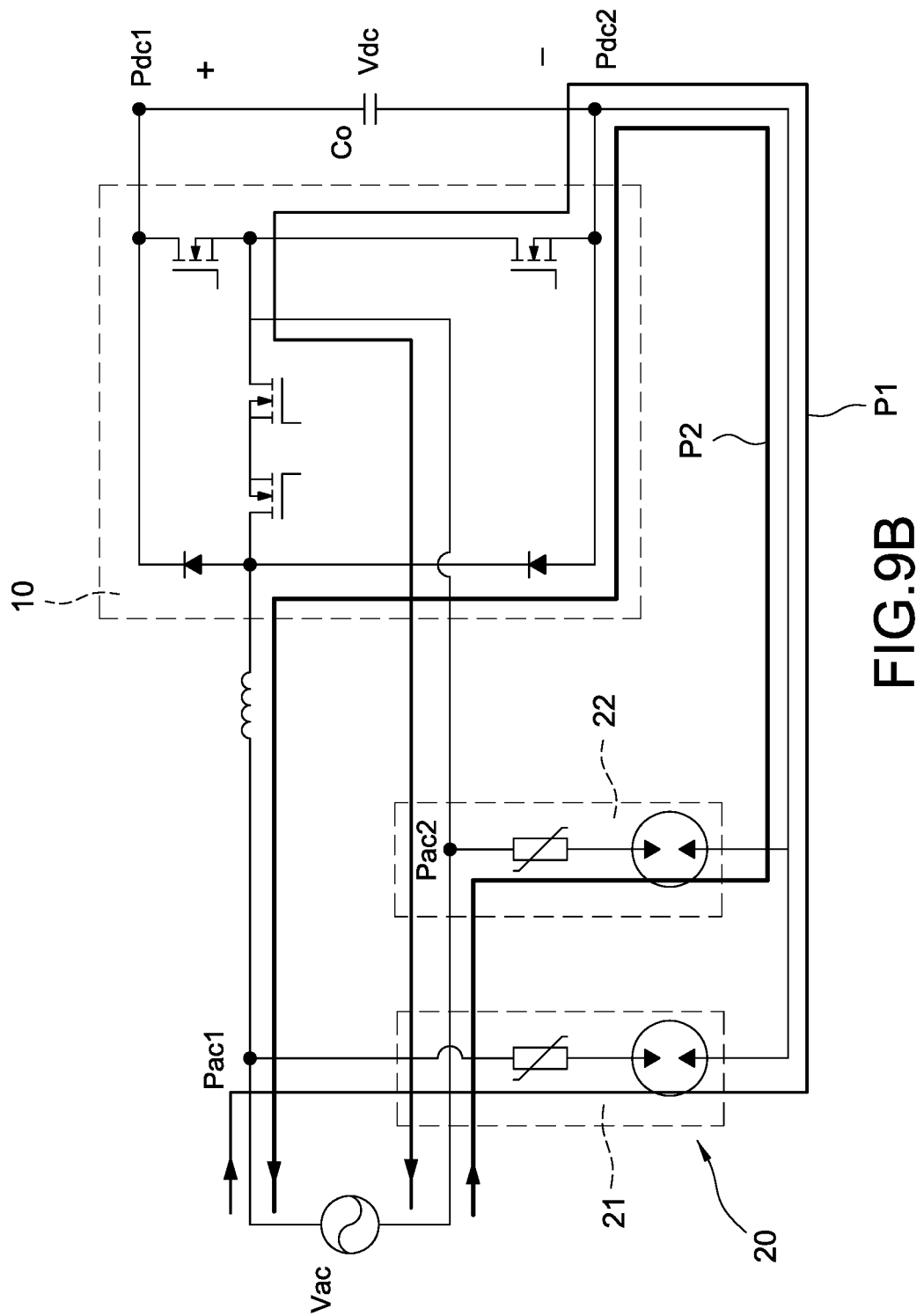
FIG. 9B is a detailed circuit diagram of the AC-to-DC conversion circuit according to the fourth embodiment in FIG. 2.
Figure 9C:
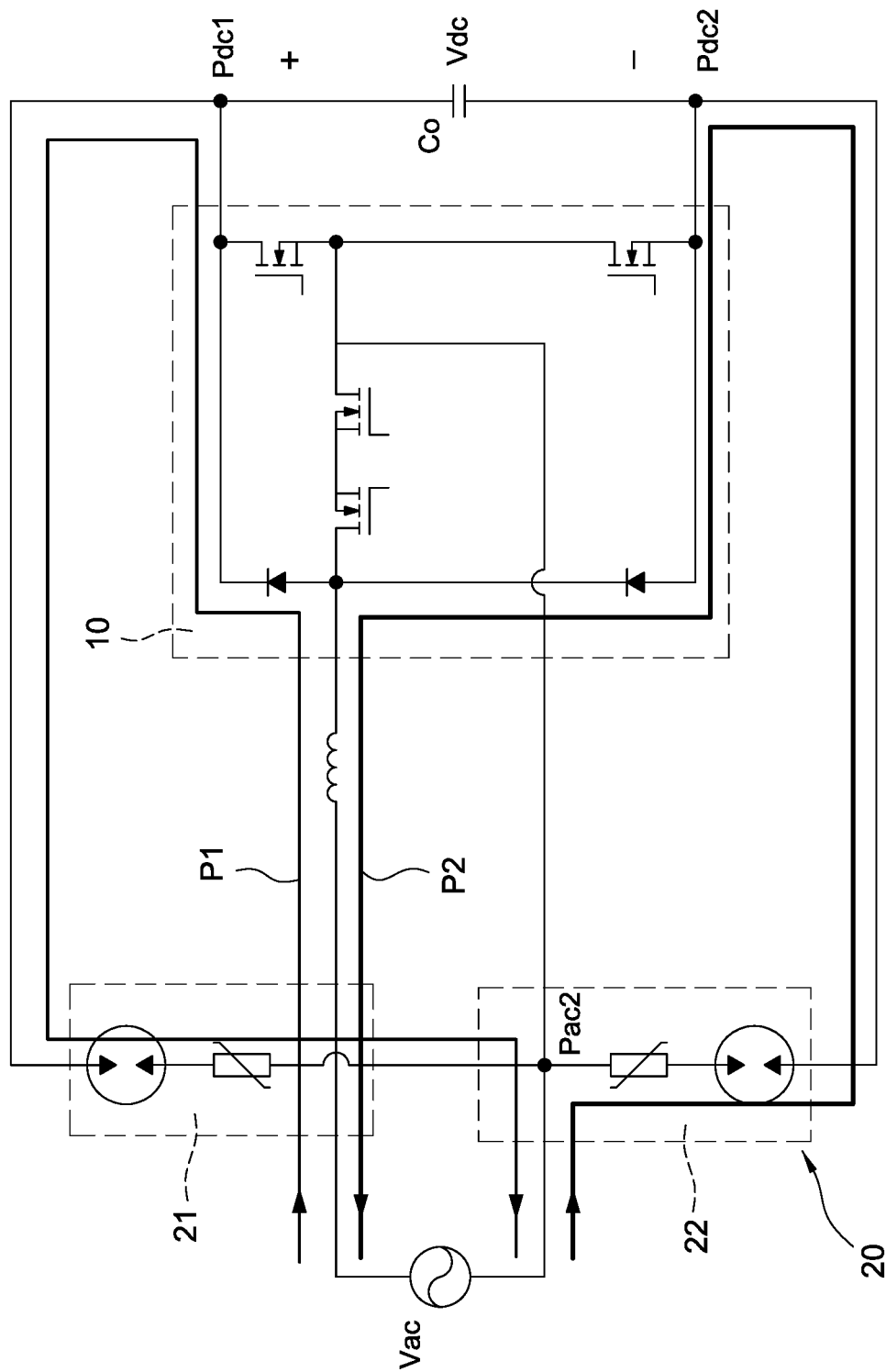
FIG. 9C is a detailed circuit diagram of the AC-to-DC conversion circuit according to the fourth embodiment in FIG. 3.
Figure 9D:
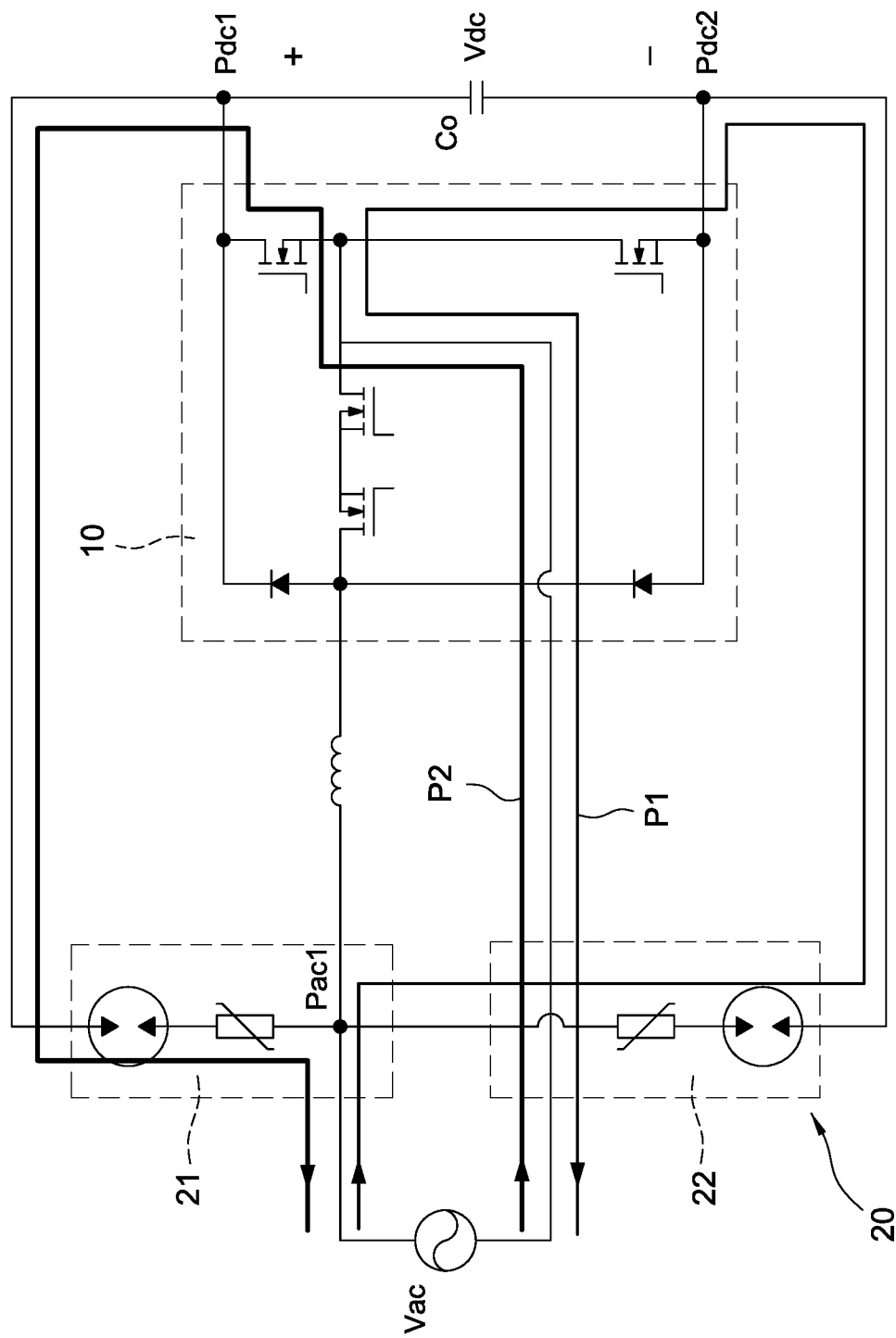
FIG. 9D is a detailed circuit diagram of the AC-to-DC conversion circuit according to the fourth embodiment in FIG. 4.

Please refer to FIG. 9A, which shows a detailed circuit diagram of the AC-to-DC conversion circuit according to a fourth embodiment in FIG. 1. The AC-to-DC conversion circuit 10 of the fourth embodiment is a boost PFC. In subsequent different embodiments, the voltage clamping unit 20 composed of the gas discharge tube GDT and the varistor VAR shown in FIG. 5A is exemplified for further demonstration. Similarly, FIG. 9B to FIG. 9D are the detailed circuit diagrams of the fourth embodiment of the AC-to-DC conversion circuit corresponding to the block circuit diagrams in FIG. 2 to FIG. 4.

The operations for providing the surge protection of the AC-to-DC conversion circuit 10 shown in FIG. 6A to FIG. 6D will be described as follows. As shown in FIG. 6A, when the AC power source Vac normally supplies power (namely, no abnormal high voltage, such as surge voltage occurs), the AC-to-DC conversion circuit 10 converts the AC power source Vac into the DC power source Vdc for supplying power to rear-stage converters or loads.

If the AC power source Vac is an abnormal high surge voltage, such as a surge voltage and no voltage clamping unit 20 is used, the AC-to-DC conversion circuit 10 would be damaged once the surge energy generated from the abnormal high surge voltage is transmitted to the AC-to-DC conversion circuit 10. Therefore, the first voltage clamping unit 21 and the second voltage clamping unit 22 are used and configured to meet the requirements of miniaturization and also protect the AC-to-DC conversion circuit 10 from damage by absorbing and suppressing the surge energy generated from the abnormal high surge voltage.

As shown in FIG. 6, the first voltage clamping unit 21 is coupled between the first AC terminal Pac1 (namely the line end) of the AC power source Vac and the positive output terminal Pdc1 of the DC power source Vdc, and the second voltage clamping unit 22 is coupled between the second AC terminal Pac2 (namely the neutral end) of the AC power source Vac and the positive output terminal Pdc1 of the DC power source Vdc so as to provide complete surge protection when the surge voltage occurs at the positive cycle or the negative cycle of the AC power source Vac. The exemplified voltage values are used for the convenience of explanation but not for limitation of the present disclosure. For example, the operation voltage across the output capacitor Co (between the positive output terminal Pdc1 and the negative output terminal Pdc2) may be 400 volts, and the operating voltage of the gas discharge tube GDT may be correspondingly determined to be 500 volts.

When the AC power source Vac normally supplies power, a voltage generated from the AC-to-DC conversion circuit 10 across the positive output terminal Pdc1 and the negative output terminal Pdc2 (namely an operation voltage across the output capacitor Co) is less than an operating voltage of the gas discharge tube GDT and is not large enough to activate (turn on) the gas discharge tube GDT so that the gas discharge tube GDT is in an open condition. At this condition, the energy generated from the AC power source Vac is transmitted to rear-stage converters or loads via the AC-to-DC conversion circuit 10.

On the contrary, when the AC power source Vac is the abnormal high surge voltage with positive impulse, the high surge voltage charges the output capacitor Co to make the voltage across the output capacitor Co dramatically increase, namely the voltage at the positive output terminal Pdc1 dramatically increases. Once the voltage across the output capacitor Co increases up to the operating voltage (namely 500 volts) of the gas discharge tube GDT, the gas discharge tube GDT of the second voltage clamping unit 22 is in a turned-on condition. At this condition, the varistor VAR of the second voltage clamping unit 22 starts to absorb the surge energy released from the DC power source Vdc to the second AC terminal Pac2 (namely the neutral end) of the AC power source Vac, and the released surge energy is represented by a first energy-releasing path P1, also called a first current-releasing path. More specifically, when the high surge voltage instantaneously occurs, the gas discharge tube GDT of the first voltage clamping unit 21 is also turned on so that the surge energy charges the output capacitor Co via the first voltage clamping unit 21. At this condition, the first voltage clamping unit 21 first absorbs a part of surge energy, and further the other part of surge energy is transmitted back to the AC power source Vac through the second voltage clamping unit 22, thereby avoiding damaging the circuit components of PFC from the surge energy.

When the AC power source Vac is the abnormal high surge voltage with negative impulse and the voltage across the output capacitor Co increases up to the operating voltage of the gas discharge tube GDT, the gas discharge tube GDT of the first voltage clamping unit 21 is in a turned-on condition. At this condition, the varistor VAR of the first voltage clamping unit 21 starts to absorb the surge energy released from the DC power source Vdc to the first AC terminal Pac1 (namely the line end) of the AC power source Vac, and the released surge energy is represented by a second energy-releasing path P2, also called a second current-releasing path. More specifically, when the high surge voltage instantaneously occurs, the gas discharge tube GDT of the second voltage clamping unit 22 is also turned on so that the surge energy charges the output capacitor Co via the second voltage clamping unit 22. At this condition, the second voltage clamping unit 22 first absorbs a part of surge energy, and further the other part of surge energy is transmitted back to the AC power source Vac through the first voltage clamping unit 21, thereby avoiding damaging the circuit components of PFC from the surge energy.

In summary, the first voltage clamping unit 21 and the second voltage clamping unit 22 can be designed to absorb and suppress the surge energy generated from the abnormal high surge voltage with positive impulse and the abnormal high surge voltage with negative impulse. Also, when the gas discharge tube GDT is in the turned-on condition due to the abnormal high surge voltage, the varistor VAR can clamp the voltage of the DC power source Vdc under a maximum clamping voltage thereof so that the surge energy in the form of current is transmitted back to the AC power source Vac through the first voltage clamping unit 21 or the second voltage clamping unit 22, thereby preventing the AC-to-DC conversion circuit 10 from the surge energy.

The major difference between FIG. 6B to FIG. 6D and FIG. 6A is that the connection positions of the first voltage clamping unit 21 and the second voltage clamping unit 22 are different each other. Also, the first voltage clamping unit 21 and the second voltage clamping unit 22 can also absorb and suppress the surge energy generated from the abnormal high surge voltage with positive impulse and the abnormal high surge voltage with negative impulse, and the energy-releasing paths are shown in the corresponding drawings, the operations of the surge protective apparatus may be with reference to the corresponding description of FIG. 6A, and the detail description is omitted here for conciseness.

Moreover, the major difference between FIG. 7A to FIG. 7D, FIG. 8A to FIG. 8D, FIG. 9A to FIG. 9D and FIG. 6A to FIG. 6D is that the AC-to-DC conversion circuit 10 is implemented with different topologies, such as the bridgeless PFC, the Totem pole PFC, and the bidirectional boost PFC. Since the usage and configuration of the first voltage clamping unit 21 and the second voltage clamping unit 22 in different corresponding drawings are substantially identical, the first voltage clamping unit 21 and the second voltage clamping unit 22 can also absorb and suppress the surge energy generated from the abnormal high surge voltage with positive impulse and the abnormal high surge voltage with negative impulse, and the energy-releasing paths are shown in the corresponding drawings, the operations of the surge protective apparatus may be with reference to the corresponding description of FIG. 6A, and the detail description is omitted here for conciseness.

Figure 10:
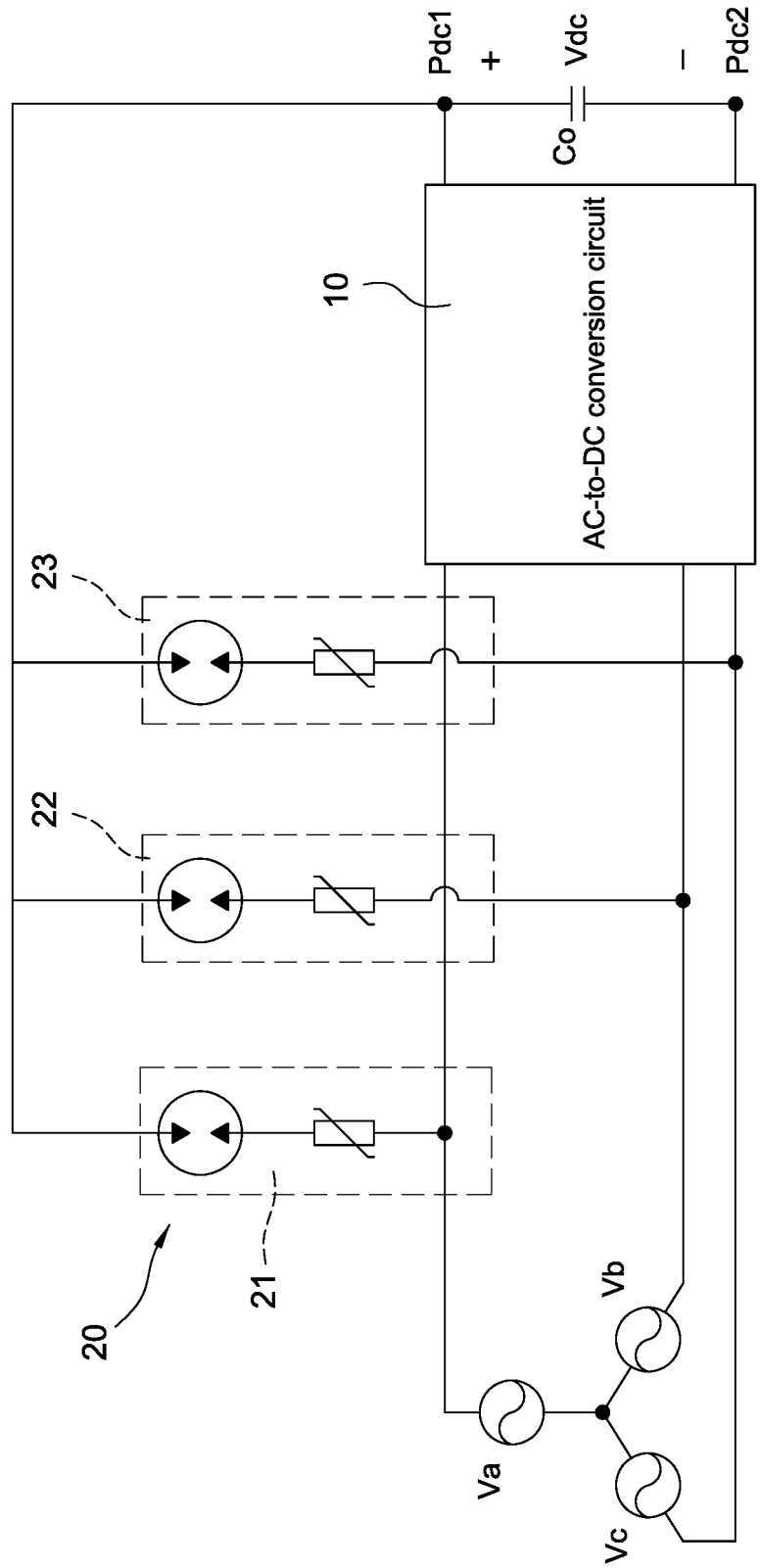
FIG. 10 is a block circuit diagram of the surge protective apparatus of the power conversion circuit according to a fifth embodiment of the present disclosure.

Please refer to FIG. 10, which shows a block circuit diagram of the surge protective apparatus of the power conversion circuit according to a fifth embodiment of the present disclosure. The surge protective apparatus of the power conversion circuit is applied to a three-phase AC power source Va,Vb,Vc, which is a wye-connected (or star-connected) configuration, to provide the surge protection for the AC-to-DC conversion circuit 10. In this embodiment, the voltage clamping unit 20 includes a first voltage clamping unit 21, a second voltage clamping unit 22, and a third voltage clamping unit 23. A first end of each voltage clamping unit 20 is correspondingly connected to a line end of one phase of the three-phase AC power source Va,Vb,Vc, and second ends of the voltage clamping units 20 are commonly coupled to the positive output terminal Pdc1 of the DC power source Vdc. For example, the first end of the first voltage clamping unit 21 is coupled to the a-phase line end of the three-phase AC power source Va,Vb,Vc, the first end of the second voltage clamping unit 22 is coupled to the b-phase line end of the three-phase AC power source Va,Vb, Vc, and the first end of the third voltage clamping unit 23 is coupled to the c-phase line end of the three-phase AC power source Va,Vb,Vc, and also the second ends of the first voltage clamping unit 21, the second voltage clamping unit 22, and the third voltage clamping unit 23 are commonly coupled to the positive output terminal Pdc1 of the DC power source Vdc, thereby absorbing and suppressing the surge energy generated from the abnormal high surge voltage to protect the AC-to-DC conversion circuit 10. Similarly, the AC-to-DC conversion circuit 10 may be a general PFC, a bridgeless PFC, a Totem pole PFC, a bidirectional boost PFC, or other converters of converting the AC power source into the DC power source.

Figure 11:
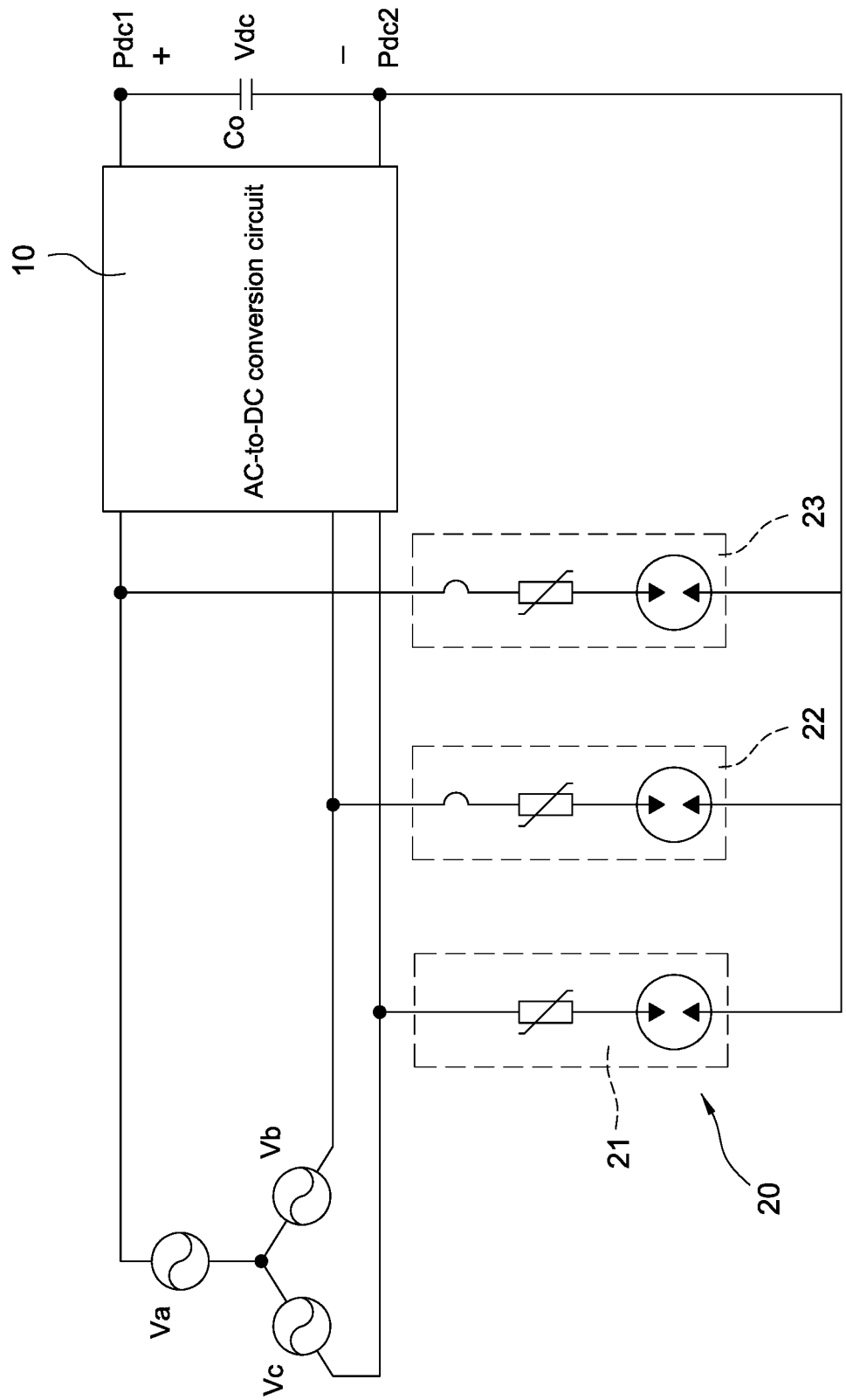
FIG. 11 is a block circuit diagram of the surge protective apparatus of the power conversion circuit according to a sixth embodiment of the present disclosure.

Please refer to FIG. 11, which shows a block circuit diagram of the surge protective apparatus of the power conversion circuit according to a sixth embodiment of the present disclosure. The major difference between the sixth embodiment shown in FIG. 11 and the fifth embodiment shown in FIG. 10 is that the second ends of the first voltage clamping unit 21, the second voltage clamping unit 22, and the third voltage clamping unit 23 of the former are commonly coupled to the negative output terminal Pdc2 of the DC power source Vdc, thereby absorbing and suppressing the surge energy generated from the abnormal high surge voltage to protect the AC-to-DC conversion circuit 10.

Figure 12:
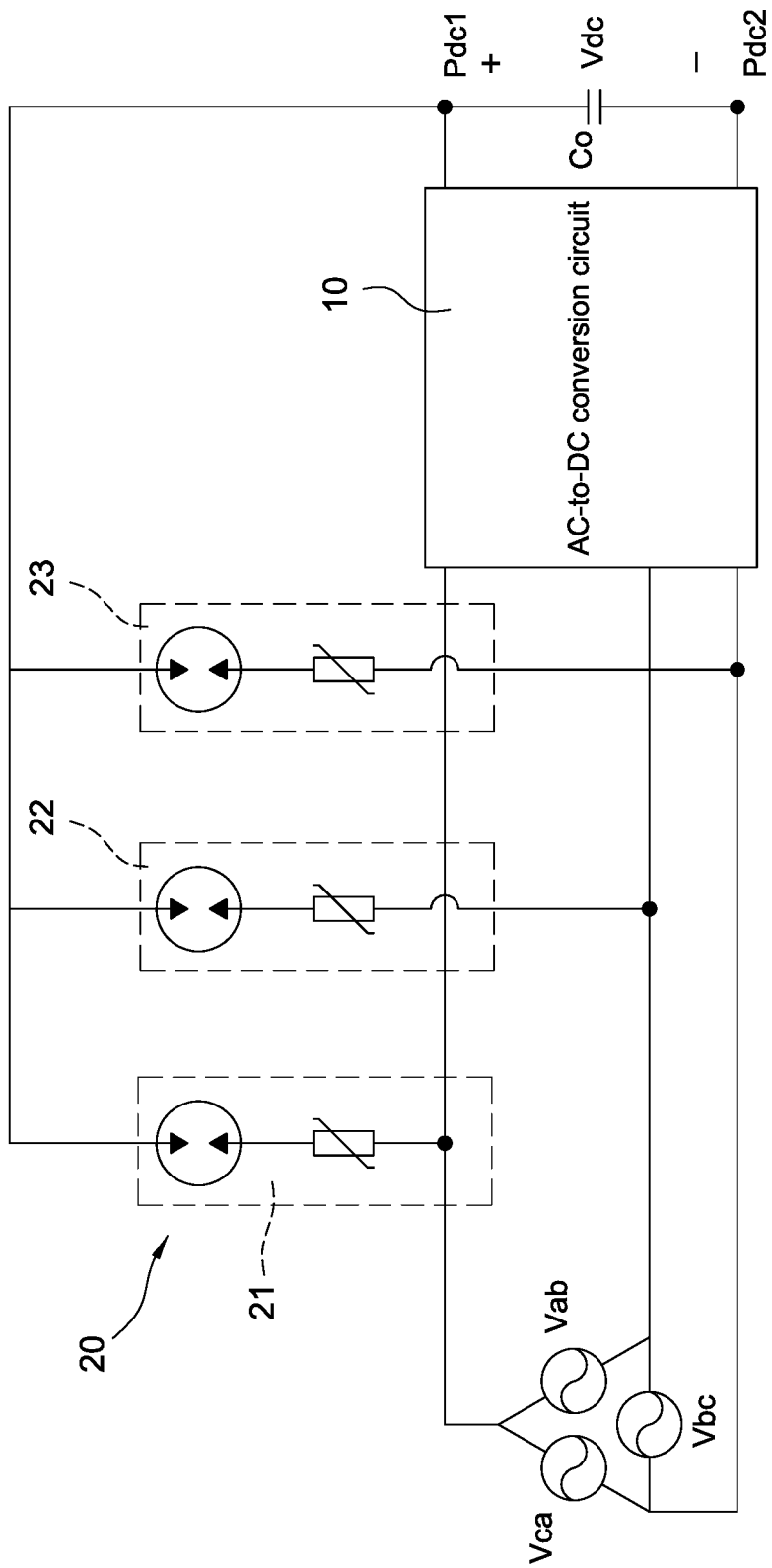
FIG. 12 is a block circuit diagram of the surge protective apparatus of the power conversion circuit according to a seventh embodiment of the present disclosure.

Please refer to FIG. 12, which shows a block circuit diagram of the surge protective apparatus of the power conversion circuit according to a seventh embodiment of the present disclosure. The major difference between the seventh embodiment shown in FIG. 12 and the fifth embodiment shown in FIG. 10 is that the surge protective apparatus of the power conversion circuit of the former is applied to the three-phase AC power source Va,Vb,Vc, which is a delta-connected (or triangle-connected) configuration, to provide the surge protection for the AC-to-DC conversion circuit 10.

Figure 13:
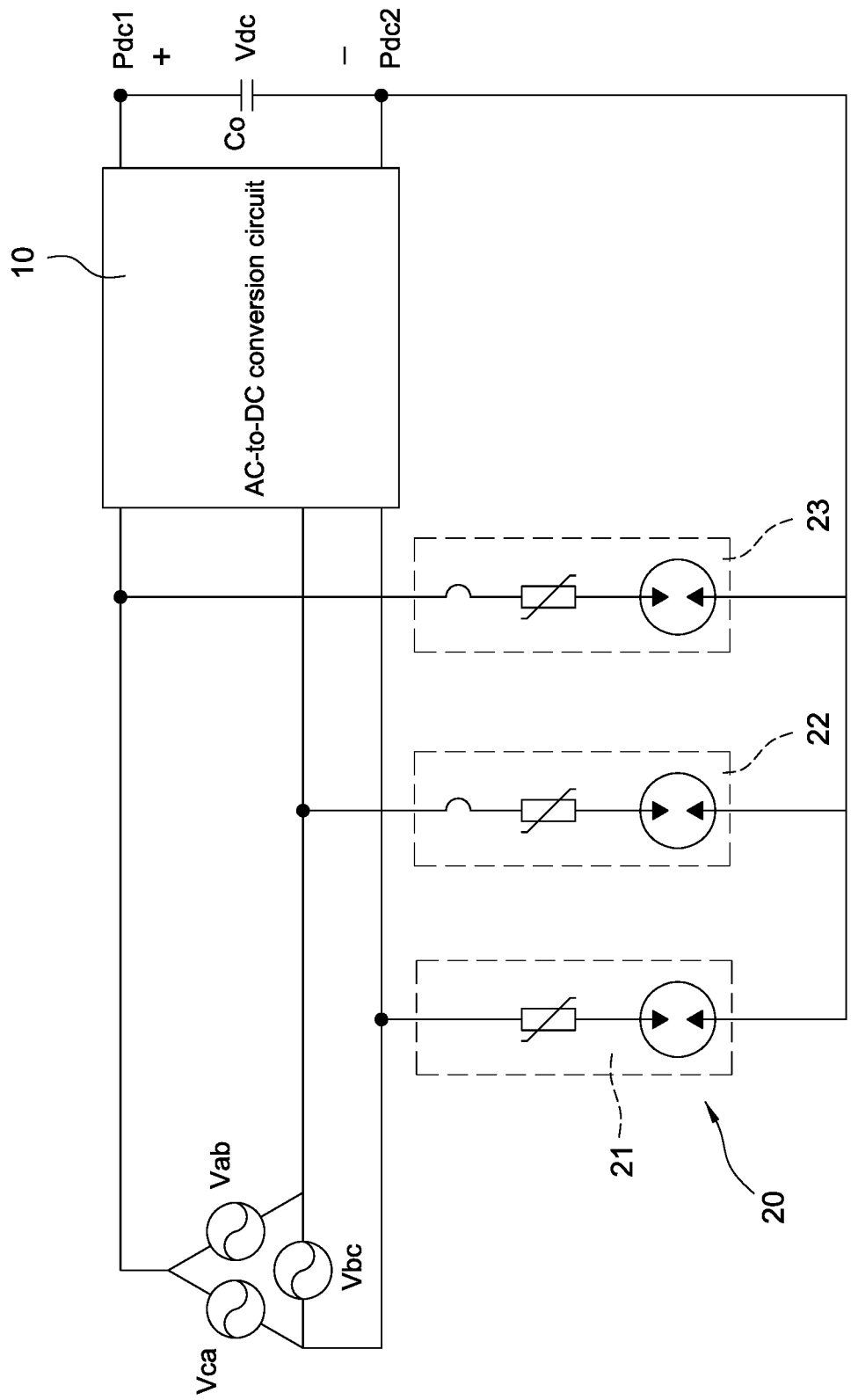
FIG. 13 is a block circuit diagram of the surge protective apparatus of the power conversion circuit according to an eighth embodiment of the present disclosure.

Please refer to FIG. 13, which shows a block circuit diagram of the surge protective apparatus of the power conversion circuit according to an eighth embodiment of the present disclosure. The major difference between the eighth embodiment shown in FIG. 13 and the seventh embodiment shown in FIG. 12 is that the second ends of the first voltage clamping unit 21, the second voltage clamping unit 22, and the third voltage clamping unit 23 of the former are commonly coupled to the negative output terminal Pdc2 of the DC power source Vdc, thereby absorbing and suppressing the surge energy generated from the abnormal high surge voltage to protect the AC-to-DC conversion circuit 10.

In conclusion, the present disclosure has following features and advantages:

1. The first voltage clamping unit 21 and the second voltage clamping unit 22 can be designed to avoid the limitation of safety approval and regulation of the protection components.

2. The first voltage clamping unit 21 and the second voltage clamping unit 22 are used and configured to reduce component costs and reduce occupied space to meet the requirements of miniaturization.

3. The surge protective apparatus of the power conversion circuit can be flexibly applied to either the single-phase AC power source or the three-phase AC power source to provide the surge protection for the AC-to-DC conversion circuit 10.

4. The first voltage clamping unit 21 and the second voltage clamping unit 22 can be designed and applied to different topologies of AC-to-DC conversion circuit 10 so as to absorb and suppress the surge energy generated from the abnormal high surge voltage with positive impulse and the abnormal high surge voltage with negative impulse, thereby avoiding damaging the AC-to-DC conversion circuit 10 from the surge energy.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A surge protective apparatus of a power conversion circuit, comprising:
   an AC-to-DC conversion circuit, which is a power factor correction circuit, configured to receive an AC power source and convert the AC power source into a DC power source, wherein the DC power source is connected across a positive output terminal and a negative output terminal of the AC-to-DC conversion circuit; and
   at least two voltage clamping units, a first end of each voltage clamping unit coupled to a first AC terminal and a second AC terminal of the AC power source, and a second end of each voltage clamping unit commonly coupled to the positive output terminal or the negative output terminal, wherein each voltage clamping unit comprises a varistor or a transient voltage suppressor, and each voltage clamping unit is configured for absorbing and suppressing surge energy and clamping a voltage across the voltage clamping unit.

2. The surge protective apparatus of the power conversion circuit in claim 1, wherein each voltage clamping unit comprises:
   the varistor; and
   a gas discharge tube connected in series to the varistor to form a series-connected structure, wherein one end of the series-connected structure is coupled to the AC power source and the other end of the series-connected structure is coupled to the DC power source.

3. The surge protective apparatus of the power conversion circuit in claim 2, wherein an operating voltage of the gas discharge tube is greater than an operation voltage across the positive output terminal and the negative output terminal.

4. The surge protective apparatus of the power conversion circuit in claim 1, wherein each voltage clamping unit comprises:
   the transient voltage suppressor, one end of the transient voltage suppressor coupled to the AC power source and the other end of the transient voltage suppressor coupled to the DC power source.

5. The surge protective apparatus of the power conversion circuit in claim 1, wherein each voltage clamping unit comprises:
   the varistor; and
   a power switch connected in series to the varistor to form a series-connected structure, one end of the series-connected structure coupled to the AC power source and the other end of the series-connected structure coupled to the DC power source.

6. The surge protective apparatus of the power conversion circuit in claim 5, further comprising:
   a control unit configured to provide a control signal to turn on or turn off the power switch.

7. The surge protective apparatus of the power conversion circuit in claim 1, wherein when the AC power source is a three-phase AC power source, the number of the at least two voltage clamping units is three and each voltage clamping unit is correspondingly coupled between one phase of the AC power source and the positive output terminal or the negative output terminal.

8. The surge protective apparatus of the power conversion circuit in claim 7, wherein the three-phase AC power source is a wye-connected configuration or a delta-connected configuration.

9. A surge protective apparatus of a power conversion circuit, comprising:
   an AC-to-DC conversion circuit, which is a power factor correction circuit, configured to receive an AC power source and convert the AC power source into a DC power source, wherein the DC power source is connected across a positive output terminal and a negative output terminal of the AC-to-DC conversion circuit; and
   at least two voltage clamping units, a first end of each voltage clamping unit coupled to a line end or a neutral end of the AC power source, and a second end of each voltage clamping unit coupled to the positive output terminal or the negative output terminal, wherein each voltage clamping unit comprises a varistor or a transient voltage suppressor, and each voltage clamping unit is configured for absorbing and suppressing surge energy and clamping a voltage across the voltage clamping unit.

10. The surge protective apparatus of the power conversion circuit in claim 9, wherein each voltage clamping unit comprises:
   the varistor; and
   a gas discharge tube connected in series to the varistor to form a series-connected structure, one end of the series-connected structure coupled to the AC power source and the other end of the series-connected structure coupled to the DC power source.

11. The surge protective apparatus of the power conversion circuit in claim 10, wherein an operating voltage of the gas discharge tube is greater than an operation voltage across the positive output terminal and the negative output terminal.

12. The surge protective apparatus of the power conversion circuit in claim 9, wherein each voltage clamping unit comprises:
   the transient voltage suppressor, one end of the transient voltage suppressor coupled to the AC power source and the other end of the transient voltage suppressor coupled to the DC power source.

13. The surge protective apparatus of the power conversion circuit in claim 9, wherein each voltage clamping unit comprises:
   the varistor; and
   a power switch connected in series to the varistor to form a series-connected structure, one end of the series-connected structure coupled to the AC power source and the other end of the series-connected structure coupled to the DC power source.

14. The surge protective apparatus of the power conversion circuit in claim 13, further comprising:
   a control unit configured to provide a control signal to turn on or turn off the power switch.

15. The surge protective apparatus of the power conversion circuit in claim 9, wherein when the AC power source is a three-phase AC power source, the number of the at least two voltage clamping units is three and each voltage clamping unit is correspondingly coupled between one phase of the AC power source and the positive output terminal or the negative output terminal.

16. The surge protective apparatus of the power conversion circuit in claim 15, wherein the three-phase AC power source is a wye-connected configuration or a delta-connected configuration.

* * * * *